US010528210B2

United States Patent
Reeves et al.

(10) Patent No.: US 10,528,210 B2
(45) Date of Patent: Jan. 7, 2020

(54) FOREGROUND/BACKGROUND ASSORTMENT OF HIDDEN WINDOWS

(71) Applicant: Z124, George Town (KY)

(72) Inventors: Brian Reeves, Hamilton (CA); Paul E. Reeves, Oakville (CA); Wuke Liu, Mississauga (CA); Borys Sushchev, Mississauga (CA)

(73) Assignee: Z124, George Town (KY)

( * ) Notice: Subject to any disclaimer, the term of this patent is extended or adjusted under 35 U.S.C. 154(b) by 682 days.

(21) Appl. No.: 14/834,305

(22) Filed: Aug. 24, 2015

(65) Prior Publication Data
US 2016/0054862 A1 Feb. 25, 2016

Related U.S. Application Data

(63) Continuation of application No. 13/399,901, filed on Feb. 17, 2012, now abandoned.
(Continued)

(51) Int. Cl.
*G06F 3/0481* (2013.01)
*G06F 3/14* (2006.01)
(Continued)

(52) U.S. Cl.
CPC ........ *G06F 3/0481* (2013.01); *G06F 3/04842* (2013.01); *G06F 3/1423* (2013.01);
(Continued)

(58) Field of Classification Search
CPC ..... G06F 3/04817; G06F 9/542; G06F 3/0484
See application file for complete search history.

(56) References Cited

U.S. PATENT DOCUMENTS 5,673,403 A 9/1997 Brown et al.
5,764,984 A 6/1998 Loucks
(Continued)

FOREIGN PATENT DOCUMENTS

JP 7-219903 8/1995
JP 08-115144 5/1996
(Continued)

OTHER PUBLICATIONS

Google images, accessed Apr. 18, 2011, 6 pages.
(Continued)

*Primary Examiner* — Li P Sun
*Assistant Examiner* — Qi Wan
(74) *Attorney, Agent, or Firm* — Sheridan Ross P.C.

(57) ABSTRACT

Graphical navigation of foreground and background applications running on a mobile computing device across multiple active user environments, even when graphics information for background applications is not maintained by a mobile operating system of the mobile computing device. A last graphical representation of an application screen may be captured as the application state is transitioned from the foreground state to the background state. The last graphical representation may be associated with a position in an application activity stack representing foreground and background mobile operating system applications. The navigation techniques may be used in a computing environment with multiple active user environments. A first active user environment may be associated with the mobile operating system. A second active user environment may be associated with the mobile operating system or a desktop operating system running concurrently with the mobile operating system on the mobile computing device.

12 Claims, 12 Drawing Sheets

Related U.S. Application Data

(60) Provisional application No. 61/389,117, filed on Oct. 1, 2010, provisional application No. 61/507,199, filed on Jul. 13, 2011, provisional application No. 61/507,201, filed on Jul. 13, 2011, provisional application No. 61/507,203, filed on Jul. 13, 2011, provisional application No. 61/507,206, filed on Jul. 13, 2011, provisional application No. 61/507,209, filed on Jul. 13, 2011.

(51) Int. Cl.
    *G09G 5/14* (2006.01)
    *G09G 5/36* (2006.01)
    *G06F 3/0484* (2013.01)

(52) U.S. Cl.
    CPC .............. *G06F 3/1454* (2013.01); *G09G 5/14* (2013.01); *G09G 5/363* (2013.01); *G09G 2370/022* (2013.01); *G09G 2370/04* (2013.01); *G09G 2370/06* (2013.01); *G09G 2370/10* (2013.01); *G09G 2370/12* (2013.01)

(56) References Cited

U.S. PATENT DOCUMENTS

| | | | |
|---|---|---|---|
| 6,178,503 B1 | 1/2001 | Madden et al. | |
| 6,182,158 B1 | 1/2001 | Kougiouris et al. | |
| 6,477,585 B1 | 11/2002 | Cohen et al. | |
| 6,507,336 B1 | 1/2003 | Lunsford | |
| 6,917,963 B1 | 7/2005 | Burton et al. | |
| 6,961,941 B1 | 11/2005 | Nelson et al. | |
| 7,069,519 B1 | 6/2006 | Okude et al. | |
| 7,284,203 B1 | 10/2007 | Meeks et al. | |
| 7,453,465 B2 | 11/2008 | Schmieder et al. | |
| 7,478,341 B2 | 1/2009 | Dove | |
| 7,565,535 B2 | 7/2009 | Roberts et al. | |
| 7,880,728 B2 | 2/2011 | de los Reyes et al. | |
| 7,950,008 B2 | 5/2011 | Bhide et al. | |
| 7,960,945 B1 | 6/2011 | Onorato et al. | |
| 8,683,496 B2 | 3/2014 | Reeves et al. | |
| 8,713,474 B2* | 4/2014 | Desai | G06F 3/0481 715/788 |
| 8,761,831 B2 | 6/2014 | Reeves | |
| 8,810,533 B2 | 8/2014 | Chen | |
| 8,819,705 B2 | 8/2014 | Reeves et al. | |
| 8,842,080 B2 | 9/2014 | Freedman | |
| 8,868,135 B2 | 10/2014 | Sirpal et al. | |
| 8,898,443 B2 | 11/2014 | Reeves et al. | |
| 8,933,949 B2 | 1/2015 | Reeves et al. | |
| 8,966,379 B2 | 2/2015 | Reeves et al. | |
| 9,026,709 B2 | 5/2015 | Reeves et al. | |
| 9,063,798 B2 | 6/2015 | Benedek | |
| 9,071,625 B2 | 6/2015 | Reeves et al. | |
| 9,098,437 B2 | 8/2015 | Benedek et al. | |
| 9,104,366 B2 | 8/2015 | Kretz | |
| 9,128,659 B2 | 9/2015 | Kretz | |
| 9,128,660 B2 | 9/2015 | Kretz | |
| 9,152,179 B2 | 10/2015 | Sirpal et al. | |
| 9,152,582 B2 | 10/2015 | Reeves et al. | |
| 2002/0157001 A1 | 10/2002 | Huang et al. | |
| 2002/0158811 A1 | 10/2002 | Davis | |
| 2003/0020954 A1 | 1/2003 | Udom et al. | |
| 2003/0079010 A1 | 4/2003 | Osborn | |
| 2003/0079205 A1 | 4/2003 | Miyao et al. | |
| 2003/0115443 A1 | 6/2003 | Cepulis et al. | |
| 2003/0174172 A1* | 9/2003 | Conrad | G06F 3/0481 715/781 |
| 2004/0137855 A1 | 7/2004 | Wiley et al. | |
| 2005/0193267 A1 | 9/2005 | Liu et al. | |
| 2005/0246505 A1 | 11/2005 | McKenney et al. | |
| 2006/0005187 A1 | 1/2006 | Neil | |
| 2006/0107020 A1 | 5/2006 | Stillwell, Jr. et al. | |
| 2006/0227806 A1 | 10/2006 | Tseng | |
| 2006/0248404 A1* | 11/2006 | Lindsay | G06F 3/0481 714/38.14 |
| 2007/0005661 A1 | 1/2007 | Yang | |
| 2007/0033260 A1 | 2/2007 | Grouzdev et al. | |
| 2007/0067769 A1 | 3/2007 | Geisinger | |
| 2007/0198760 A1 | 8/2007 | Han | |
| 2007/0245263 A1* | 10/2007 | Hale | G06F 9/4443 715/810 |
| 2007/0271522 A1 | 11/2007 | Son et al. | |
| 2007/0288941 A1 | 12/2007 | Dunshea et al. | |
| 2008/0082815 A1 | 4/2008 | Kawano et al. | |
| 2008/0090525 A1 | 4/2008 | Joo | |
| 2008/0119731 A1 | 5/2008 | Becerra et al. | |
| 2008/0134061 A1 | 6/2008 | Banerjee et al. | |
| 2008/0244599 A1 | 10/2008 | Hodson et al. | |
| 2009/0055749 A1* | 2/2009 | Chatterjee | G06F 3/04817 715/738 |
| 2009/0094523 A1* | 4/2009 | Treder | G06F 9/542 715/738 |
| 2009/0119580 A1 | 5/2009 | Rohrabaugh et al. | |
| 2009/0138818 A1 | 5/2009 | Nemoto | |
| 2009/0193364 A1* | 7/2009 | Jarrett | G06F 3/04817 715/838 |
| 2009/0217071 A1 | 8/2009 | Huang et al. | |
| 2009/0249331 A1 | 10/2009 | Davis et al. | |
| 2009/0278806 A1 | 11/2009 | Duarte et al. | |
| 2009/0313440 A1 | 12/2009 | Kim et al. | |
| 2009/0327560 A1 | 12/2009 | Yalovsky | |
| 2009/0327905 A1* | 12/2009 | Mascarenhas | H04L 67/36 715/738 |
| 2010/0005396 A1 | 1/2010 | Nason et al. | |
| 2010/0046026 A1 | 2/2010 | Heo | |
| 2010/0060549 A1 | 3/2010 | Tsern | |
| 2010/0063994 A1 | 3/2010 | Cook et al. | |
| 2010/0064228 A1 | 3/2010 | Tsern | |
| 2010/0064244 A1 | 3/2010 | Kilpatrick et al. | |
| 2010/0107163 A1 | 4/2010 | Lee | |
| 2010/0149121 A1 | 6/2010 | Alexander et al. | |
| 2010/0211769 A1 | 8/2010 | Shankar et al. | |
| 2010/0246119 A1 | 9/2010 | Collopy et al. | |
| 2010/0250975 A1 | 9/2010 | Gill et al. | |
| 2010/0251233 A1 | 9/2010 | Majewski et al. | |
| 2011/0093691 A1 | 4/2011 | Galicia et al. | |
| 2011/0138314 A1* | 6/2011 | Mir | G06F 3/0484 715/779 |
| 2011/0246904 A1 | 10/2011 | Pinto et al. | |
| 2011/0273464 A1 | 11/2011 | Brunner et al. | |
| 2012/0084675 A1 | 4/2012 | Sirpal et al. | |
| 2012/0084697 A1 | 4/2012 | Reeves | |
| 2012/0158829 A1* | 6/2012 | Ahmavaara | H04L 63/101 709/203 |
| 2012/0172088 A1 | 7/2012 | Kirch et al. | |
| 2012/0176413 A1 | 7/2012 | Kulik et al. | |
| 2012/0188185 A1 | 7/2012 | Cassar | |
| 2012/0278747 A1 | 11/2012 | Abraham et al. | |
| 2012/0278750 A1 | 11/2012 | Abraham et al. | |
| 2013/0024778 A1 | 1/2013 | Reeves et al. | |
| 2013/0024812 A1 | 1/2013 | Reeves et al. | |
| 2013/0076683 A1 | 3/2013 | Reeves | |
| 2013/0080945 A1 | 3/2013 | Reeves | |
| 2013/0088411 A1 | 4/2013 | Reeves et al. | |
| 2013/0219162 A1 | 8/2013 | Reeves et al. | |
| 2013/0312106 A1 | 11/2013 | Reeves et al. | |
| 2014/0201679 A1* | 7/2014 | Desai | G06F 9/4445 715/790 |

FOREIGN PATENT DOCUMENTS

| | | |
|---|---|---|
| JP | 2008-225546 | 9/2008 |
| KR | 1020020092969 | 12/2002 |
| KR | 100578592 | 5/2006 |
| KR | 1020060081997 | 7/2006 |
| KR | 100616157 | 8/2006 |
| KR | 100883208 | 2/2009 |
| KR | 1020100043434 | 4/2010 |
| WO | WO 2006/075859 | 7/2006 |
| WO | WO 2008/132924 | 11/2008 |

(56) References Cited

FOREIGN PATENT DOCUMENTS

| WO | WO 2012/044645 | 4/2012 |
|---|---|---|
| WO | WO 2012/044738 | 4/2012 |
| WO | WO 2012/044872 | 4/2012 |

OTHER PUBLICATIONS

Google Transliteration IME website, 2010, available at www.google.com/ime/transliteration/help.html#features, 8 pages.
InputKing Online Input System, 2011, available at www.inputking.com, 2 pages.
"Lapdock™ for Motorola ATRIX," at http://www.motorola.com/Consumers/US-EN/Consumer-Product-and-Services/Mobile . . . , accessed Apr. 18, 2011, 1 page.
"Motorola ATRIX 4G Laptop Dock Review," at http://www.phonearena.com/reviews/Motorola-ATRIX-4G-Laptop-Dock-Review_id2667, Mar. 2, 2011, 6 pages.
Website entitled, "Kyocera Echo," at www.echobykyocera.com/, 2011, 6 pages.
Website entitled, "Sony Tablet," at www.store.sony.com/webapp/wcs/stores/servlet/CategoryDisplay?catalogId=10551&storeId=10151&langId=-1&categoryId=8198552921644795521, 2011, 3 pages.
Wikipedia, "Balloon help," Jul. 18, 2011, available at www.en.wikipedia.org/wiki/Balloon_help, 3 pages.
Wikipedia, "Google Pinyin," Aug. 27, 2011 available at www.en.wikipedia.org/wiki/Google_Pinyin, 3 pages.
Wikipedia, "Mouseover," Sep. 29, 2011, available at www.en.wikipedia.org/wiki/Mouseover, 2 pages.
Wikipedia, "Predictive text," Aug. 7, 2011, available at www.en.wikipedia.org/wiki/Predictive_test, 6 pages.
Wikipedia, "Sogou Pinyin," Jul. 23, 2011 available at www.en.wikipedia.org/wiki/Sogou_Pinyin, 3 pages.
Wikipedia, "Status bar," Sep. 8, 2011, available at www.en.wikipedia.org/wiki/Status_bar, 3 pages.
Wikipedia, "Tooltip," Sep. 17, 2011, available at www.en.wikipedia.org/wiki/Tooltip, 2 pages.
Burns, C., "Motorola ATRIX 4G Laptop Dock Review," at http://androidcommunity.com/motorola-atrix-4g-laptop-dock-review-20110220/, Feb. 20, 2011, 5 pages.
Catacchio, Chad, "This smartphone has two huge screens . . . that rotate," The Next Web at http://thenextweb.com/asia/2010/10/07/this-smartphone-has-two-huge-screens-that-rotate/, Jul. 21, 2011, 2 pages.
Harman03, "Kyocera Echo Dual-screen Android Phone," posted 4 weeks from Apr. 18, 2011, 3 pages.
Sakhr Software—Arabic Optical Character Recognition, Jul. 15, 2011, available at www.sakhr.com/ocr.aspx, 1 page.
Stein, S., "How does the Motorola Atrix 4G Lapdock compare with a laptop?" Crave—CNET, at http://news.cnet.com/8301-17938_105-20031251-1.html, Feb. 9, 2011, 7 pages.
Sud, et al., "Dynamic Migration of Computation Through Virtualization of the Mobile Platform," Mobile Networks and Applications, 2012, (published online Feb. 22, 2011), vol. 17, Iss. 2, pp. 206-215.
International Search Report for International (PCT) Patent Application No. PCT/US2012/046798, dated Feb. 20, 2013 3 pages.
International Preliminary Report on Patentability for International (PCT) Patent Application No. PCT/US2012/046798, dated Jan. 23, 2014 6 pages.
Official Action for U.S. Appl. No. 13/399,901, dated Aug. 2, 2013 17 pages.
Final Action for U.S. Appl. No. 13/399,901, dated Dec. 26, 2013 20 pages.
Official Action for U.S. Appl. No. 13/399,901, dated May 1, 2014 17 pages.
Official Action for U.S. Appl. No. 13/399,901, dated Oct. 29, 2014 23 pages.
Official Action for U.S. Appl. No. 13/399,901, dated May 22, 2015 23 pages.

* cited by examiner

FOREGROUND/BACKGROUND ASSORTMENT OF HIDDEN WINDOWS

CROSS REFERENCE TO RELATED APPLICATION

The present application is a continuation of and claims priority to U.S. patent application Ser. No. 13/399,901, filed on Feb. 17, 2012, which claims the benefits of and priority, under 35 U.S.C. § 119(e), to U.S. Provisional Application Nos. 61/389,117, filed on Oct. 1, 2010; 61/507,199, filed on Jul. 13, 2011; 61/507,201, filed on Jul. 13, 2011; 61/507,203, filed on Jul. 13, 2011; 61/507,206 filed on Jul. 13, 2011; and 61/507,209, filed on Jul. 13, 2011, each of which is incorporated herein by reference in its entirety for all that it teaches and for all purposes.

BACKGROUND

1. Field

This Application relates generally to the field of mobile computing environments, and more particularly to supporting application navigation in a mobile computing environment with multiple active user environments.

2. Relevant Background

Mobile communications devices are becoming ubiquitous in today's society. For example, as of the end of 2008, 90 percent of Americans had a mobile wireless device. Among the fastest growing mobile communications devices are smartphones, that is, mobile phones built on top of a mobile computing platform. Mobile providers have launched hundreds of new smartphones in the last three years based upon several different computing platforms (e.g., Apple iPhone, Android, BlackBerry, Palm, Windows Mobile, and the like). In the U.S., smartphone penetration reached almost 23% by the middle of 2010, and over 35% in some age-groups. In Europe, the smartphone market grew by 41% from 2009 to 2010, with over 60 million smartphone subscribers as of July 2010 in the five largest European countries alone.

Smartphone computing platforms typically include a mobile operating system ("OS") running on a mobile processor. While mobile processors and mobile OSs have increased the capabilities of these devices, smartphones have not tended to replace personal computer ("PC") environments (i.e., Windows, Mac OS X, Linux, and the like) such as desktop or notebook computers at least because of the limited user experience provided. In particular, smartphones typically have different processing resources, user interface device(s), peripheral devices, and applications. For example, mobile processors may have a different processor architecture than PC processors that emphasizes features like low-power operation and communications capabilities over raw processing and/or graphics performance. In addition, smartphones tend to have smaller amounts of other hardware resources such as memory (e.g., SRAM, DRAM, etc.) and storage (e.g., hard disk, SSD, etc.) resources. Other considerations typically include a smaller display size that limits the amount of information that can be presented through a mobile OS graphical user interface ("GUI") and different user input devices. Use interface input device(s) for smartphones typically include a small thumb-style QWERTY keyboard, touch-screen display, click-wheel, and/or scroll-wheel. In contrast, laptop, notebook, and desktop computers that use a desktop OS typically have a full-size keyboard, pointing device(s), and/or a larger screen area. As a result, mobile OSs typically have a different architecture where some capabilities and features such as communications, lower power consumption, touch-screen capability, and the like, are emphasized over traditionally emphasized PC capabilities such as processing speed, graphics processing, and application multi-tasking.

Because of the architecture differences, applications or "Apps" designed for mobile Oss tend to be designed for tasks and activities that are typical of a mobile computing experience (e.g., communications, gaming, navigation, and the like). For example, over a third of all Android App downloads have been targeted towards the gaming and entertainment categories while less than 20% of downloads fall under the tools and productivity categories. In addition, many applications that are common on PC platforms are either not available for mobile OSs or are available only with a limited features set.

For example, many smartphones run Google's Android operating system. Android runs only applications that are specifically developed to run within a Java-based virtual machine runtime environment. In addition, while Android is based on a modified Linux kernel, it uses different standard C libraries, system managers, and services than Linux. Accordingly, applications written for Linux do not run on Android without modification or porting. Similarly, Apple's iPhone uses the iOS mobile operating system. Again, while iOS is derived from Mac OS X, applications developed for OS X do not run on iOS. Therefore, while many applications are available for mobile OSs such as Android and iOS, many other common applications for desktop operating systems such as Linux and Mac OS X are either not available on the mobile platforms or have limited funcitonality. As such, these mobile OSs provide Accordingly, smartphones are typically suited for a limited set of user experiences and provide applications designed primarily for the mobile environment. In particular, smartphones do not provide a suitable desktop user experience, nor do they run most common desktop applications. For some tasks such as typing or editing documents, the user interface components typically found on a smartphones tend to be more difficult to use than a full-size keyboard and large display that may be typically found on a PC platform.

As a result, many users carry and use multiple computing devices including a smartphone, laptop, and/or tablet computer. In this instance, each device has its own CPU, memory, file storage, and operating system. Connectivity and file sharing between smartphones and other computing devices involves linking one device (e.g., smartphone, running a mobile OS) to a second, wholly disparate device (e.g., notebook, desktop, or tablet running a desktop OS), through a wireless or wired connection. Information is shared across devices by synchronizing data between applications running separately on each device. This process, typically called "synching," is cumbersome and generally requires active management by the user.

SUMMARY

Embodiments of the present invention are directed to providing the mobile computing experience of a smartphone and the appropriate user experience of a secondary terminal environment in a single mobile computing device. A secondary terminal environment may be some combination of visual rendering devices (e.g., monitor or display), input devices (e.g., mouse, touch pad, touch-screen, keyboard, etc.), and other computing peripherals (e.g., HDD, optical disc drive, memory stick, camera, printer, etc.) connected to the computing device by a wired (e.g., USB, Firewire, Thunderbolt, etc.) or wireless (e.g., Bluetooth, WiFi, etc.) connection. In embodiments, a mobile operating system associated with the user experience of the mobile environment and a desktop operating system associated with the user experience of the secondary terminal environment are run concurrently and independently on a shared kernel.

According to one aspect consistent with various embodiments, a mobile computing device includes a first operating system. A first application is running on the mobile operating system. A first application screen, associated with the first application, is displayed on an active display device. For example, the application screen may be displayed on a display of the mobile computing device. A process for managing application graphics associated with the application includes receiving an application interaction state change event indicating that a current interaction state of the first application is to be changed from a foreground state to a background state, generating a bitmap image corresponding to a graphical representation of the first application screen, changing the current interaction state of the first application from the foreground state to the background state, associating the bitmap image with a position within an application activity stack corresponding to the application, receiving a user input command related to the application activity stack, and displaying a representation of the bitmap image within a graphical representation of the application activity stack. The process may include receiving a user command indicative of a selection of the bitmap image within the graphical representation of the application activity stack, and changing the current interaction state of the first application from the background state to the foreground state.

According to other aspects consistent with various embodiments, the mobile computing device may define a first user environment, and the graphical representation of the application activity stack may be presented on a display of a second user environment. The second user environment may be associated with a second operating system running concurrently with the first operating system on a shared kernel of the mobile computing device. The application activity stack may be maintained by an application model manager. The application activity stack may include applications that have been started by the user and not actively closed by the user. A process associated with the first application screen may be suspended in response to the change in the current interaction state of the first application from the foreground state to the background state.

According to other aspects consistent with various embodiments, a mobile computing device includes a first application and a second application running concurrently on a first operating system. A process for managing application graphics may include displaying the first application on an active display device, receiving an application interaction state change event indicating that a current interaction state of the first application is to be changed from a foreground state to a background state, generating a bitmap image corresponding to a graphical representation of an application screen associated with the first application, changing the current interaction state of the first application from the foreground state to the background state, associating the bitmap image with a position within an application activity stack corresponding to the application, and displaying a graphical representation of the application activity stack on a display device associated with a secondary terminal environment, the secondary terminal environment connected to the mobile computing device via a communications interface, the graphical representation of the application activity stack including the bitmap image.

According to other aspects consistent with various embodiments, the secondary terminal environment may be associated with a second operating system running concurrently with the first operating system on a shared kernel of the mobile computing device. Displaying of the graphical representation of the application activity stack may be in response to a user initiated event within the secondary terminal environment and/or a dock event. The dock event may include connecting the mobile computing device with the secondary terminal environment via the communications interface. The bitmap image may be generated from graphical information maintained by a bitmap server within a surface manager of the first operating system. The bitmap server may provide an application level interface to the bitmap image data.

According to other aspects consistent with various embodiments, a mobile computing device includes a first operating system and a display device. A first application screen, associated with a first application running on the first operating system, is displayed on the display device. The first application may be considered to be in a foreground state. The first operating system includes an activity manager that maintains a list of currently running applications, an application model manager of the first operating system that receives application state information from the activity manager service, and a bitmap server module that maintains references to active surfaces of the first application. The bitmap server module may store a copy of the surface information of the first application screen responsive to an application interaction state change event indicating that a current interaction state of the first application is to be changed from the foreground state to a background state. The first operating system may display a transition animation based on the copy of the surface information of the first application screen. The transition animation may be displayed by an application space component of the first operating system. The first operating system may be a mobile operating system. The mobile operating system may include a surface manager module, and the bitmap server module may be implemented as a class in the surface manager module. The bitmap server module may provide references to the copy of the surface information of the first application screen to the framework layer of the mobile operating system. The bitmap server module may create a bitmap image from the copy of the surface information of the first application screen.

BRIEF DESCRIPTION OF THE DRAWINGS

Embodiments of the present invention are illustrated in referenced figures of the drawings, in which like numbers refer to like elements throughout the description of the figures.

DETAILED DESCRIPTION

Figure 1:
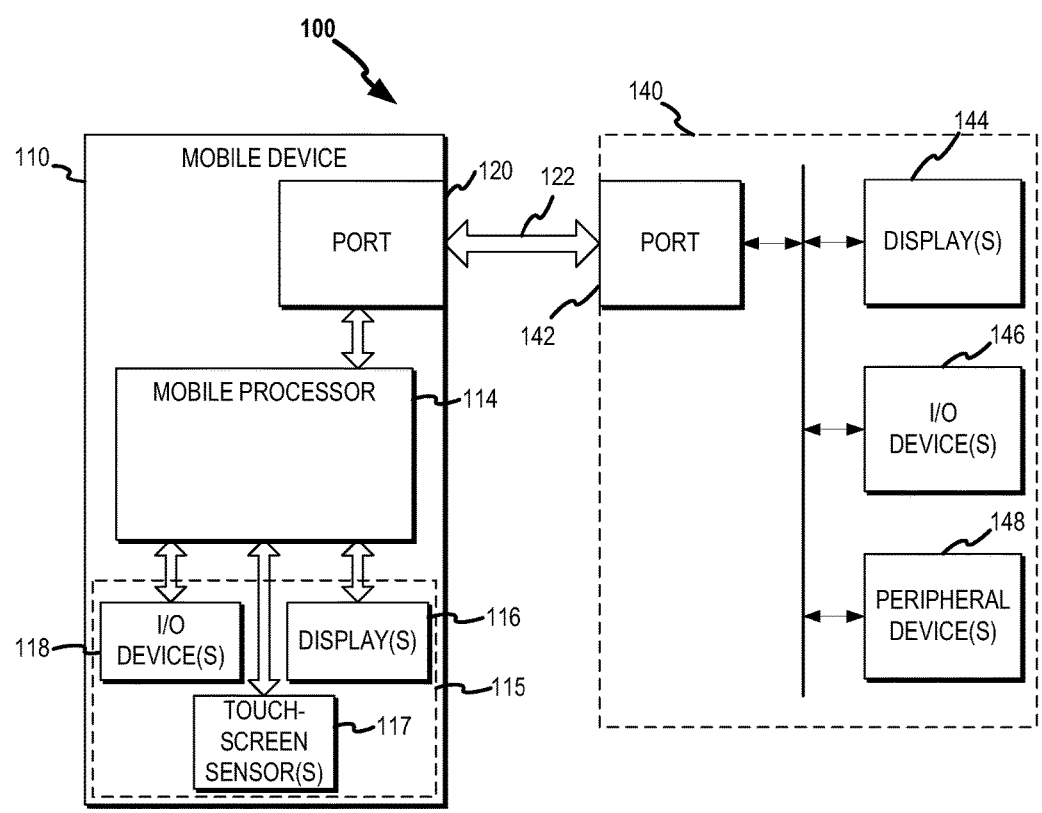
FIG. 1 illustrates a computing environment that provides multiple user computing experiences, according to various embodiments.

The present disclosure is generally directed to managing navigation of foreground and background applications in a computing environment with multiple active user environments. More particularly, applications or "Apps" may be running on a mobile operating system ("OS") of a mobile computing device that generally defines a first active user environment. The mobile OS typically presents a single active application (i.e., foreground application) at a time through a graphical user interface ("GUI") of the mobile operating system. Other applications may be running on the mobile operating system but not actively displayed (i.e., background applications). Commonly, processes of back ground applications related to displaying graphics information and accepting user input are suspended or paused by the mobile operating system. While some of these processes may save an instance state of application data before being paused or suspended, the mobile OS typically does not update or maintain graphical information for these processes while the application is in the background. Navigation among foreground and background applications running on the mobile OS on the mobile computing device typically consists of navigating away from the foreground application (e.g., back to a home screen, etc.) before selecting an icon associated with a background application.

In a computing environment with multiple active user environments, it may be desirable to present user interfaces for multiple concurrent applications within an active user environment of the computing environment. Additionally, it may be desirable to graphically browse and/or navigate through applications running on a first operating system through a second active user environment. For example, cross environment application browsing and/or navigation using preview representations of application screens may allow faster cross-environment application navigation as they provide a visual representation of an application state.

In disclosed embodiments with multiple active user environments, a mobile computing device running a mobile operating system defines a first active user environment. A second active user environment may be connected to the mobile computing device. Mobile OS applications may be accessed from and actively displayed through the second active user environment. In embodiments, the second active user environment may be associated with a second operating system (e.g., a desktop operating system) running on the mobile computing device.

Disclosed embodiments present a seamless computing experience in a computing environment with multiple active user environments by automatically presenting application screens across user environments in certain conditions. Other disclosed embodiments support graphical navigation of foreground and background applications of the mobile operating system across multiple active user environments. For example, preview screens of foreground and background applications running on the mobile operating system may be displayed within the second active user environment to allow a user to navigate quickly between applications running on the mobile operating system. Disclosed techniques allow graphical cross-environment application navigation even where the mobile operating system does not maintain graphical information for background applications of the mobile OS. For example, graphical and/or user input processes of background applications may be paused, stopped, suspended, and/or killed. In various embodiments, a last graphical representation of a mobile OS application is captured before the application is moved from a foreground state to a background state and graphical information and/or user input processes of the application are paused or suspended. The last graphical representation for mobile OS applications may be maintained as bitmap images or graphics surface information. While the foreground/background application navigation techniques presented in the disclosure are discussed with reference to a mobile computing device and various docked terminal environments, the disclosure may, in various embodiments, be applied to other computing devices (e.g., laptop computers, tablet computers, desktop computers, etc.) and is not intended to be limited to handheld mobile computing devices unless otherwise explicitly specified.

FIG. 1 illustrates a computing environment 100 that provides multiple user computing experiences through multiple active user environments, according to various embodiments. A first active user environment 115 of computing environment 100 is defined by display(s) 116, touch screen sensor(s) 117, and/or I/O devices 118 of mobile computing device 110. The display(s) 116 may be operative to display a displayed image or "screen." As used herein, the term display is intended to connote device hardware, whereas screen is intended to connote the displayed image produced on the display. In this regard, a display is physical hardware that is operable to present a screen to the user. A screen may encompass a majority of one or more displays. For instance, a screen may occupy substantially all of the display area of one or more displays except for areas dedicated to other functions (e.g. menu bars, status bars, etc.). A screen may be associated with an application and/or an operating system executing on the mobile computing device 110. For instance, applications may have various kinds of screens that are capable of being manipulated as will be described further below.

When mobile computing device 110 is operated as a stand-alone mobile device, active user environment 115 presents a typical mobile computing user experience. In this regard, mobile computing device 110 typically includes mobile telephony capabilities and user interaction features suited to a mobile computing use model. For example, mobile computing device 110 may present a graphical user interface ("GUI") suited to active user environment 115 including display(s) 116, touch-screen sensor(s) 117, and/or I/O device(s) 118. The user may interact with application programs (i.e., "Apps") running on mobile computing device 110 through an application screen including various interactive features (e.g., buttons, text fields, toggle fields, etc.) presented on display(s) 116. In some instances, the user interacts with these interactive features by way of I/O device(s) 118. In other instances, the user interacts with these features by way of touch-screen sensor(s) 117 using gestures and symbols that are input to touch screen sensor(s) 117 using the user's fingers or a stylus. In yet other instances, the user interacts with these features using a combination of I/O device(s) 118 and touch-screen sensor(s) 117.

Figure 2:
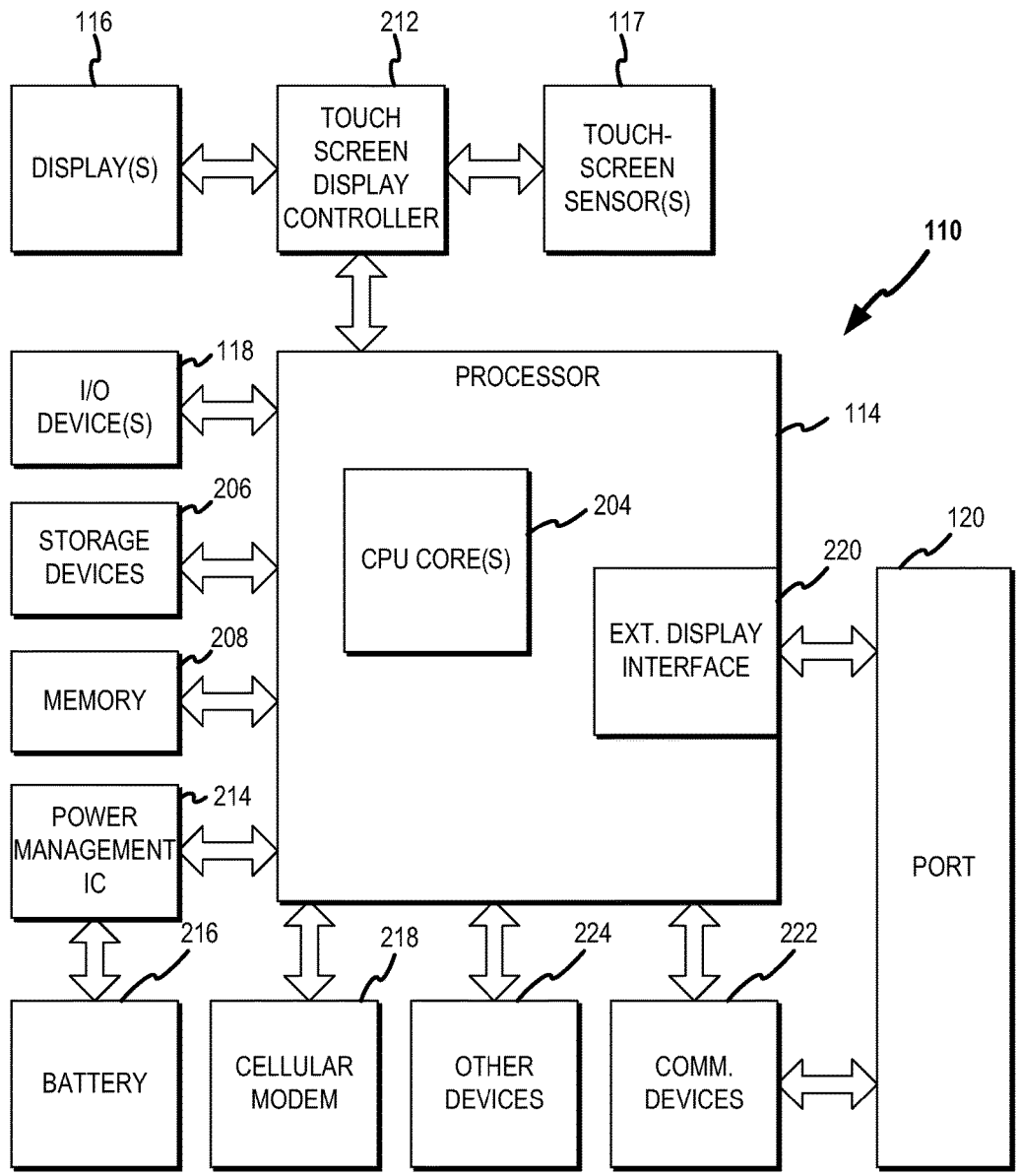
FIG. 2 illustrates an exemplary system architecture for a mobile computing device, according to various embodiments.

FIG. 2 illustrates an exemplary hardware system architecture for mobile computing device 110, according to various embodiments. Mobile computing device 110 includes mobile processor 114 with one or more CPU cores 204 and external display interface 220. Generally, mobile computing device 110 also includes memory 206, storage devices 208, touch-screen display controller 212 connected to touch-screen display(s) 116 and/or touch-screen sensor(s) 117, I/O devices 118, power management IC 214 connected to battery 216, cellular modem 218, communication devices 222, and/or other devices 224 that are connected to processor 114 through various communication signals and interfaces. I/O devices 118 generally includes buttons and other user interface components that may be employed in mobile computing device 110. For example, I/O devices 118 may include a set of buttons, (e.g., back, menu, home, search, etc.), off-screen gesture area, click-wheel, scroll-wheel, QWERTY keyboard, etc. Other devices 224 may include, for example, GPS devices, LAN connectivity, microphones, speakers, cameras, accelerometers, gyroscopes, magnetometers, and/or MS/MMC/SD/SDIO card interfaces. External display interface 220 may be any suitable display interface (e.g., VGA, DVI, HDMI, wireless, etc.).

One or more sensor devices of the mobile computing device 110 may be able to monitor the orientation of the mobile computing device with respect to gravity. For example, using an accelerometer, gyroscope, inclinometer, or magnetometer, or some combination of these sensors, mobile computing device 110 may be able to determine whether it is substantially in a portrait orientation (meaning that a long axis of the display(s) 116 are oriented vertically) or substantially in a landscape orientation with respect to gravity. These devices may further provide other control functionality by monitoring the orientation and/or movement of the mobile computing device 110. As used herein, the term orientation sensor is intended to mean some combination of sensors (e.g., accelerometer, gyroscope, inclinometer, magnetometer, etc.) that may be used to determine orientation of a device with respect to gravity and is not intended to be limited to any particular sensor type or technology.

Processor 114 may be an ARM-based mobile processor. In embodiments, mobile processor 114 is a mobile ARM-based processor such as Texas Instruments OMAP3430, Marvell PXA320, Freescale iMX51, or Qualcomm QSD8650/8250. However, mobile processor 114 may be another suitable ARM-based mobile processor or processor based on other processor architectures such as, for example, x86-based processor architectures or other RISC-based processor architectures.

While FIG. 2 illustrates one exemplary hardware implementation 112 for mobile computing device 110, other architectures are contemplated as within the scope of the invention. For example, various components illustrated in FIG. 2 as external to mobile processor 114 may be integrated into mobile processor 114. Optionally, external display interface 220, shown in FIG. 2 as integrated into mobile processor 114, may be external to mobile processor 114. Additionally, other computer architectures employing a system bus, discrete graphics processor, and/or other architectural variations are suitable for employing aspects of the present invention.

Returning to FIG. 1, mobile computing device 110 may be docked with a secondary terminal environment 140. Secondary terminal environment 140 may be some combination of visual rendering devices (e.g., monitor or display) 140, I/O devices (e.g., mouse, touch pad, touch-screen, keyboard, etc.) 146, and other computing peripherals (e.g., HDD, optical disc drive, memory stick, camera, printer, GPS, accelerometer, etc.) 148 connected to mobile computing device 110 by connecting port 142 on secondary terminal environment 140 with port 120 on mobile computing device 110 through interface 122. Interface 122 may be some combination of wired (e.g., USB, Firewire, Thunderbolt, HDMI, VGA, etc.) or wireless (e.g., Bluetooth, WiFi, Wireless HDMI, etc.) interfaces. While secondary terminal environments may have some processing or logic elements such as microcontrollers or other application specific integrated circuits ("ASICs"), they typically do not have a processor that runs a separate instance of an operating system.

Secondary terminal environments that define a second user environment may be suited for one or more of various use models, depending on the components that make up the secondary terminal environment. Some secondary terminal environments may be associated with a user computing experience that is similar to the user computing experience of the mobile computing device 110, while others may provide a user computing experience more traditionally associated with desktop computing. For example, secondary terminal environment 140 may be a device that includes a display 144 with a corresponding touch-screen sensor 146 that serves as the primary user input for the device. This type of secondary terminal environment may be called a tablet-style secondary terminal environment. While a tablet-style secondary terminal environment may have a larger touch-screen display than mobile computing device 110, the user experience of this type of secondary terminal environment may be similar in some ways to the user experience of mobile computing device 110. Specifically, it may be convenient for a user to interact with applications displayed on this type of secondary terminal environment through similar gesture-based techniques (i.e., touching, swiping, pinching, etc.) and/or virtual keyboards as they might use on mobile computing device 110. In one embodiment known as a "Smart Pad," a tablet-style secondary terminal environment includes a 10.1-inch diagonal (1280×800 resolution) touch-enabled display, standard set of buttons (e.g., back, menu, home, search, etc.), one or more cameras, and an off-screen gesture area. A tablet-style secondary terminal environment may include other peripheral devices 148 that may be used to influence the configuration of applications presented to the user on the tablet-style secondary terminal environment. For example, a tablet-style secondary terminal environment may include a GPS receiver, accelerometer, gyroscope, magnetometer, and/or other sensors for determining its location and/or orientation.

Another type of secondary terminal environment is a laptop or notebook-style secondary terminal environment. A notebook-style secondary terminal environment generally includes a display screen 144, keyboard and pointing device(s) 146, and/or other peripheral devices 148 in a clam-shell type enclosure. In embodiments, a laptop or notebook-style secondary terminal environment may be known as a "Smart Display" or "LapDock." Because this type of secondary terminal environment includes a larger display, keyboard, and pointing device(s), it typically has a user computing experience associated with a desktop computing experience. In this regard, this type of secondary terminal environment may not have a similar user experience profile to mobile computing device 110. A notebook-style secondary terminal environment may include other peripheral devices that may be used to influence the configuration of applications presented to the user on the secondary terminal environment. For example, a notebook-style secondary terminal environment may include a GPS receiver, accelerometer, gyroscope, magnetometer, and/or other sensors for determining its location and/or orientation.

The various secondary terminal environments may also include a variety of generic input/output device peripherals that make up a typical desktop computing environment. The I/O devices may be connected through a docking hub (or "dock cradle") that includes port 142 and one or more device I/O ports for connecting various commercially available display monitors 144, I/O devices 146, and/or other peripheral devices 148. For example, a docking hub may include a display port (e.g., VGA, DVI, HDMI, Wireless HDMI, etc.), and generic device ports (e.g., USB, Firewire, etc.). As one example, a user may connect a commercially available display, keyboard, and pointing device(s) to the docking hub. In this way, the user may create a secondary terminal environment from a combination of input/output devices. Commonly, this secondary terminal environment will be suited to a desktop computing experience. In particular, this type of secondary terminal environment may be suited to a computing experience designed around the use of a pointing device(s) and physical keyboard to interact with a user interface on the display.

In embodiments, mobile computing device 110 includes multiple operating systems running concurrently and independently on a shared kernel. Concurrent execution of a mobile OS and a desktop OS on a shared kernel is described in more detail in U.S. patent application Ser. No. 13/217,108, filed Aug. 24, 2011, entitled "MULTI-OPERATING SYSTEM," herein incorporated by reference. In this way, a single mobile computing device can concurrently provide a mobile computing experience through a first user environment associated with a mobile OS and a desktop computing experience through a second user environment associated with a full desktop OS.

Figure 3:
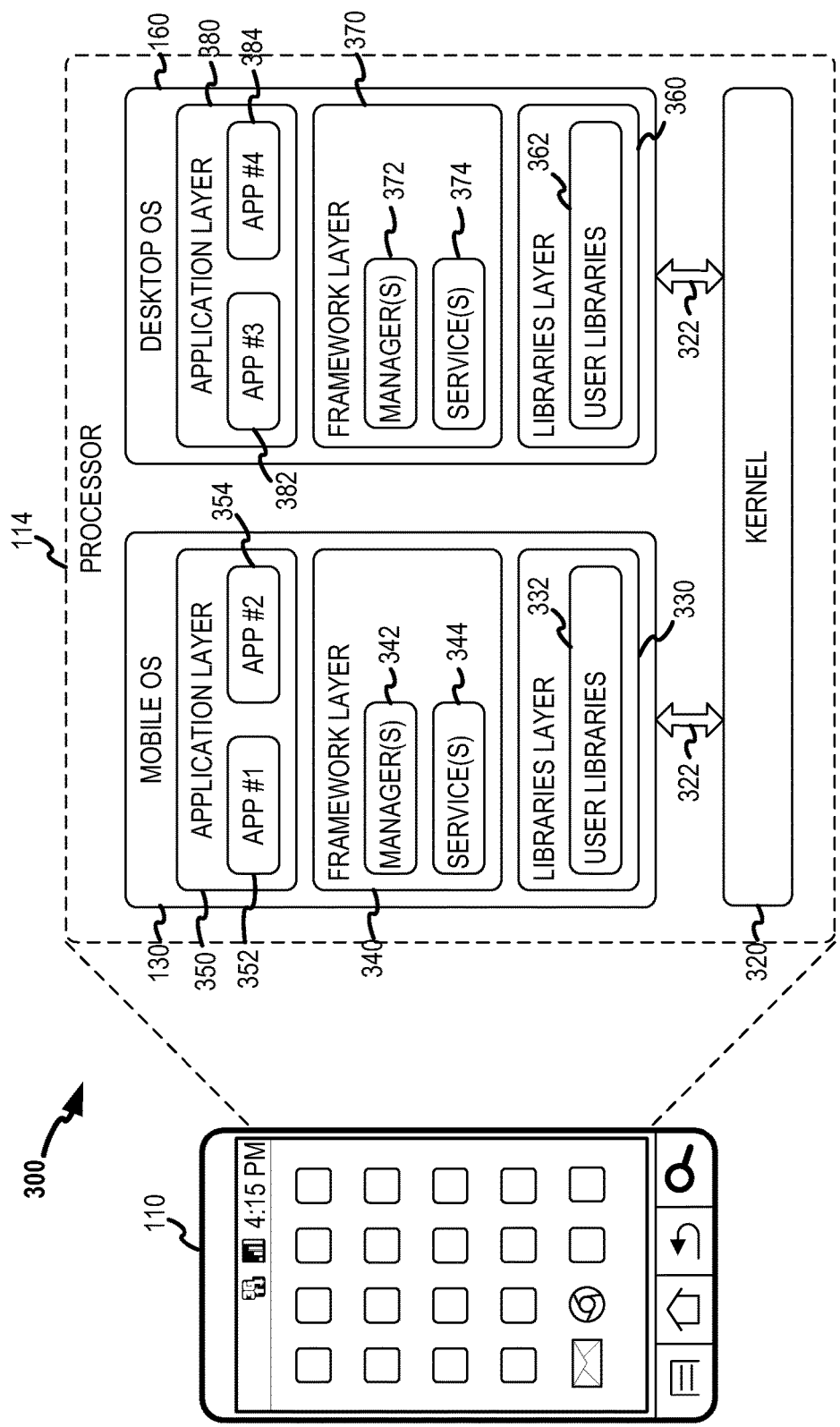
FIG. 3 illustrates an operating system architecture for a computing environment, according to various embodiments.

FIG. 3 illustrates OS architecture 300 that may be employed to run mobile OS 130 and desktop OS 160 concurrently on mobile computing device 110, according to various embodiments. As illustrated in FIG. 3, mobile OS 130 and desktop OS 160 are independent operating systems running concurrently on shared kernel 320. Specifically, mobile OS 130 and desktop OS 160 are considered independent and concurrent because they are running on shared kernel 320 at the same time and may have separate and incompatible user libraries, graphics systems, and/or framework layers. For example, mobile OS 130 and desktop OS 160 may both interface to shared kernel 320 through the same kernel interface 322 (e.g., system calls, etc.). In this regard, shared kernel 320 manages task scheduling for processes of both mobile OS 130 and desktop OS 160 concurrently.

In addition, shared kernel 320 runs directly on mobile processor 114 of mobile computing device 110, as illustrated in FIG. 3. Specifically, shared kernel 320 directly manages the computing resources of processor 114 such as CPU scheduling, memory access, and I/O. In this regard, hardware resources are not virtualized, meaning that mobile OS 130 and desktop OS 160 make system calls through kernel interface 322 without virtualized memory or I/O access. Functions and instructions for OS architecture 300 may be stored as computer program code on a tangible computer readable medium of mobile computing device 110. For example, instructions for OS architecture 300 may be stored in storage device(s) 208 of mobile computing device 110.

As illustrated in FIG. 3, mobile OS 130 has libraries layer 330, application framework layer 340, and application layer 350. In mobile OS 130, applications 352 and 354 run in application layer 350 supported by application framework layer 340 of mobile OS 130. Application framework layer 340 includes manager(s) 342 and service(s) 344 that are used by applications running on mobile OS 130. Libraries layer 330 includes user libraries 332 that implement common functions such as I/O and string manipulation, graphics functions, database capabilities, communication capabilities, and/or other functions and capabilities.

Application framework layer 340 may include a window manager, activity manager, package manager, resource manager, telephony manager, gesture controller, and/or other managers and services for the mobile environment. Application framework layer 340 may include a mobile application runtime environment that executes applications developed for mobile OS 130. The mobile application runtime environment may be optimized for mobile computing resources such as lower processing power and/or limited memory space.

Applications running on mobile OS 130 may be composed of multiple application components that perform the functions associated with the application, where each component is a separate process. For example, a mobile OS application may be composed of processes for displaying graphical information, handling user input, managing data, communicating with other applications/processes, and/or other types of processes.

As illustrated in FIG. 3, desktop OS 160 has libraries layer 360, framework layer 370, and application layer 380. In desktop OS 160, applications 382 and 384 run in application layer 380 supported by application framework layer 370 of desktop OS 160. Application framework layer 370 includes manager(s) 372 and service(s) 374 that are used by applications running on desktop OS 160. For example, application framework layer 370 may include a window manager, activity manager, package manager, resource manager, and/or other managers and services common to a desktop environment. Libraries layer 360 may include user libraries 362 that implement common functions such as I/O and string manipulation, graphics functions, database capabilities, communication capabilities, and/or other functions and capabilities.

As described above, mobile operating systems typically do not use the same graphics environment as desktop operating systems. Specifically, graphics environments for mobile OSs are designed for efficiency and the specific user input devices of a mobile computing environment. For example, display devices of mobile computing devices are typically too small to present multiple active application screens at the same time. Accordingly, most mobile OS GUIs present a single active application screen that consumes all or substantially all of the active area of the display of the mobile computing device. In addition, presenting a single active application screen at a time allows the mobile OS to shut down or suspend graphical and/or user interaction processes of background applications. Shutting down or suspending background application processes conserves power which is critical to providing long battery life in a mobile computing device.

In contrast, graphics environments for desktop OSs are designed for flexibility and high performance. For example, desktop OSs typically provide a multi-tasking user interface where more than one application screen may be presented through the desktop OS GUI at the same time. Graphics information for multiple applications may be displayed within windows of the GUI of the desktop operating system that are cascaded, tiled, and/or otherwise displayed concurrently in overlapping or non-overlapping fashion. This type of graphical environment provides for greater flexibility because multiple applications may be presented through multiple active application screens. While only a single application may have the input focus (i.e., the application to which input such as keyboard entry is directed), switching back and forth between applications does not require resuming or restarting the application and rebuilding the application screen. Commonly, switching input focus back and forth between active applications may involve selecting an application window or switching the focus to an application window by placing the mouse pointer over the application window. In this regard, desktop OSs typically maintain graphics information (i.e., graphics and user input processes continue to run) for all running applications, whether the application screens associated with the applications are active or not (e.g., in the background, etc.). However, maintaining multiple active application screens requires greater processing and system resources.

Accordingly, mobile OS 130 and desktop 160 may be independent operating systems with incompatible user libraries, graphics systems, and/or application frameworks. Therefore, applications developed for mobile OS 130 may not run directly on desktop OS 160, and applications developed for desktop OS 160 may not run directly on mobile OS 130. For example, application 352, running in application layer 350 of mobile OS 130, may be incompatible with desktop OS 160, meaning that application 352 could not run on desktop OS 160. Specifically, application 352 may depend on manager(s) 342, service(s) 344, and/or libraries 332 of mobile OS 130 that are either not available or not compatible with manager(s) 372, service(s) 374, and/or libraries 362 of desktop OS 160.

In various embodiments of the present disclosure, desktop OS 160 runs in a separate execution environment from mobile OS 130. For example, mobile OS 130 may run in a root execution environment and desktop OS 160 may run in a secondary execution environment established under the root execution environment. Processes and applications running on mobile OS 130 access user libraries 332, manager(s) 342 and service(s) 344 in the root execution environment. Processes and applications running on desktop OS 160 access user libraries 362, manager(s) 372 and service(s) 374 in the secondary execution environment.

The most widely adopted mobile OS is Google's Android. While Android is based on Linux, it includes modifications to the kernel and other OS layers for the mobile environment and mobile processors. In particular, while the Linux kernel is designed for a PC (i.e., x86) CPU architecture, the Android kernel is modified for ARM-based mobile processors. Android device drivers are also particularly tailored for devices typically present in a mobile hardware architecture including touch-screens, mobile connectivity (GSM/EDGE, CDMA, Wi-Fi, etc.), battery management, GPS, accelerometers, and camera modules, among other devices. In addition, Android does not have a native X Window System nor does it support the full set of standard GNU libraries, and this makes it difficult to port existing GNU/Linux applications or libraries to Android.

Apple's iOS operating system (run on the iPhone) and Microsoft's Windows Phone 7 are similarly modified for the mobile environment and mobile hardware architecture. For example, while iOS is derived from the Mac OS X desktop OS, common Mac OS X applications do not run natively on iOS. Specifically, iOS applications are developed through a standard developer's kit ("SDK") to run within the "Cocoa Touch" runtime environment of iOS, which provides basic application infrastructure and support for key iOS features such as touch-based input, push notifications, and system services. Therefore, applications written for Mac OS X do not run on iOS without porting. In addition, it may be difficult to port Mac OS X applications to iOS because of differences between user libraries and/or application framework layers of the two OSs, and/or differences in system resources of the mobile and desktop hardware.

Figure 4:
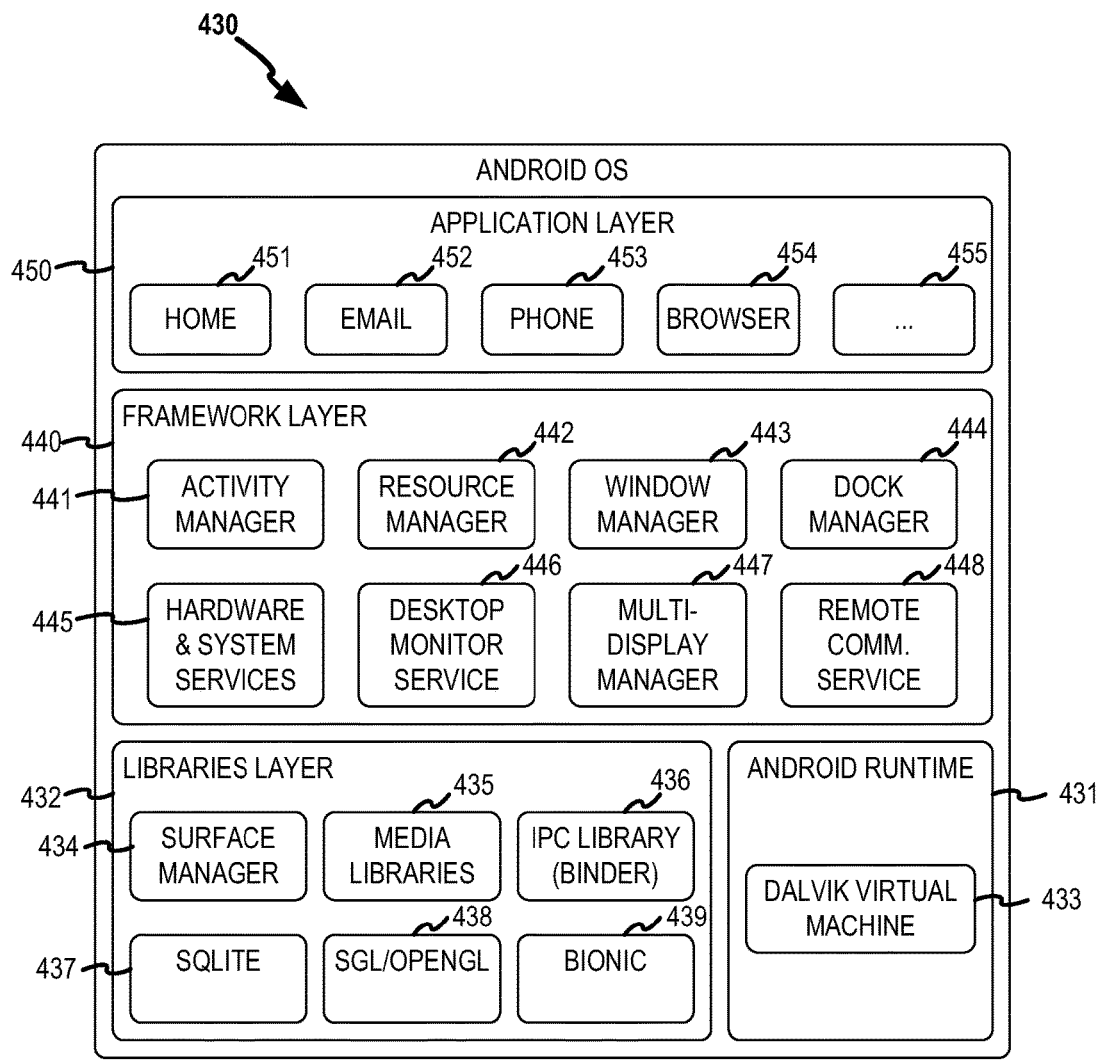
FIG. 4 illustrates an operating system architecture for a computing environment, according to various embodiments.
Figure 5:
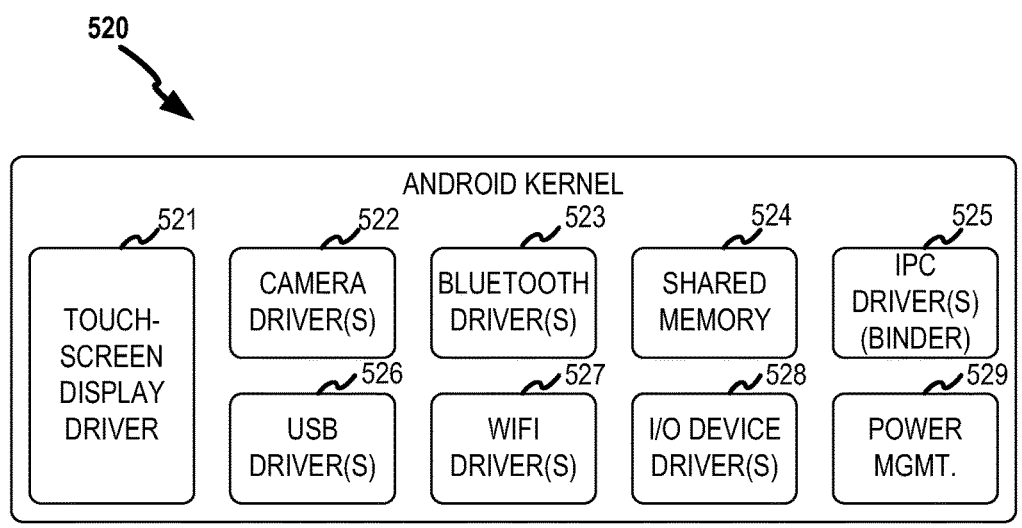
FIG. 5 illustrates aspects of a kernel for a computing environment, according to various embodiments.
Figure 6:
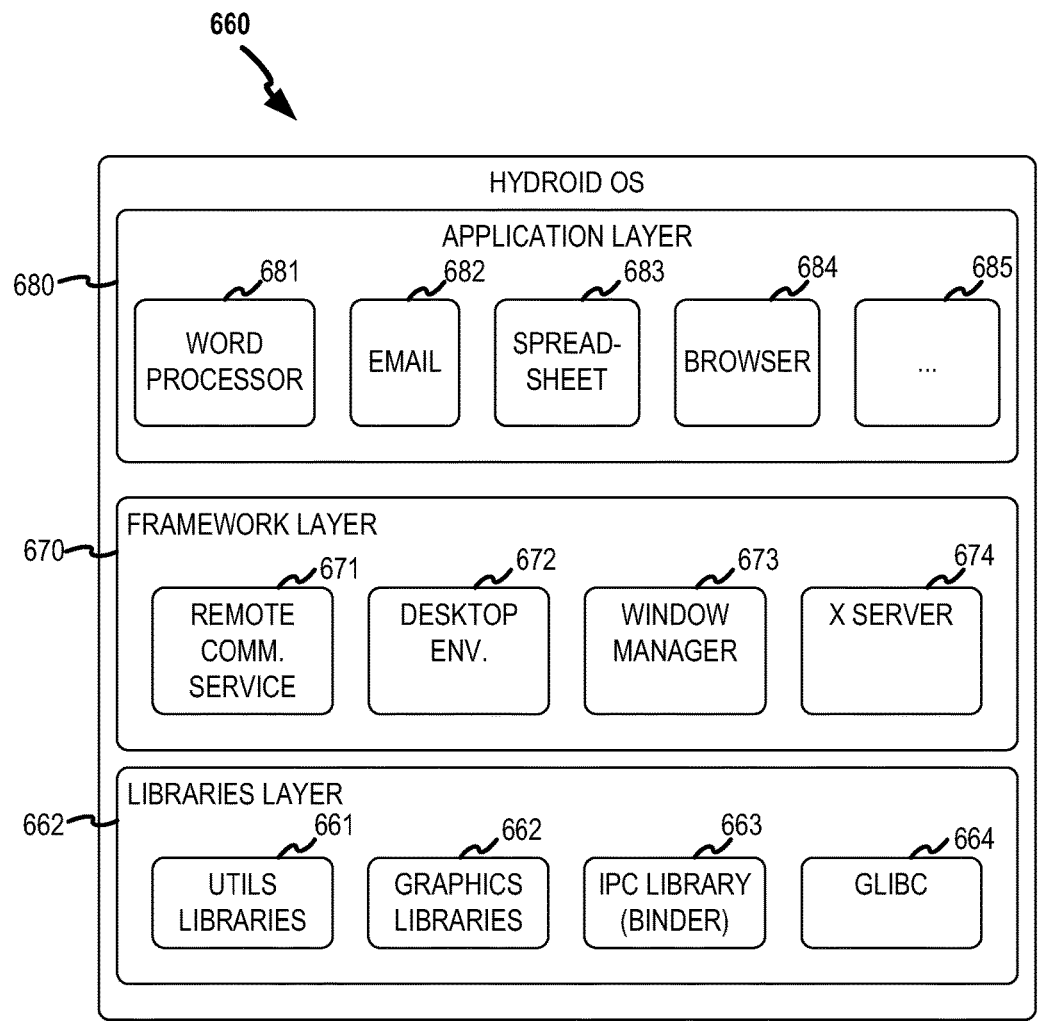
FIG. 6 illustrates an operating system architecture for a computing environment, according to various embodiments.

In one embodiment consistent with OS architecture 300, an Android mobile OS and a full Linux OS run independently and concurrently on a modified Android kernel. In this embodiment, the Android OS may be a modified Android distribution while the Linux OS ("Hydroid") may be a modified Debian Linux desktop OS. FIGS. 4-6 illustrate Android mobile OS 430, Android kernel 520, and Hydroid OS 660 that may be employed in OS architecture 300 in more detail, according to various embodiments.

As illustrated in FIG. 4, Android OS 430 includes a set of C/C++ libraries in libraries layer 432 that are accessed through application framework layer 440. Libraries layer 432 includes the "bionic" system C library 439 that was developed specifically for Android to be smaller and faster than the "glibc" Linux C-library. Libraries layer 432 also includes inter-process communication ("IPC") library 436, which includes the base classes for the "Binder" IPC mechanism of the Android OS. Binder was developed specifically for Android to allow communication between processes and services. Other libraries shown in libraries layer 432 in FIG. 4 include media libraries 435 that support recording and playback of media formats, surface manager 434 that manages access to the display subsystem and composites graphic layers from multiple applications, 2D and 3D graphics engines 438, and lightweight relational database engine 437. Other libraries that may be included in libraries layer 432 but are not pictured in FIG. 4 include bitmap and vector font rendering libraries, utilities libraries, browser tools (i.e., WebKit, etc.), and/or secure communication libraries (i.e., SSL, etc.).

Application framework layer 440 of Android OS 430 provides a development platform that allows developers to use components of the device hardware, access location information, run background services, set alarms, add notifications to the status bar, etc. Framework layer 440 also allows applications to publish their capabilities and make use of the published capabilities of other applications. Components of application framework layer 440 of Android mobile OS 430 include activity manager 441, resource manager 442, window manager 443, dock manager 444, hardware and system services 445, desktop monitor service 446, multi-display manager 447, and remote communication service 448. Other components that may be included in framework layer 440 of Android mobile OS 430 include a view system, telephony manager, package manager, location manager, and/or notification manager, among other managers and services.

Applications running on Android OS 430 run within the Dalvik virtual machine 431 in the Android runtime environment 433 on top of the Android object-oriented application framework. Dalvik virtual machine 431 is a registerbased virtual machine, and runs a compact executable format that is designed to reduce memory usage and processing requirements. Applications running on Android OS 430 include home screen 451, email application 452, phone application 453, browser application 454, and/or other application(s) ("App(s)") 455. Each application may include one or more application components including activities which define application screens through which the user interfaces with the application. That is, activities are processes within the Android runtime environment that manage user interaction through application screens. Other application components include services for performing long-running operations or non-user interface features, content providers for managing shared data, and broadcast receivers for responding to system broadcast messages.

The Android OS graphics system uses a client/server model. A surface manager ("SurfaceFlinger") is the graphics server and applications are the clients. SurfaceFlinger maintains a list of display ID's and keeps track of assigning applications to display ID's. In one embodiment, mobile computing device 110 has multiple touch screen displays 116. In this embodiment, display ID 0 is associated with one of the touch screen displays 116 and display ID 1 is associated with the other touch screen display 116. Display ID 2 is associated with both touch screen displays 116 (i.e., the application is displayed on both displays at the same time).

For each display device associated with a display ID, Android maintains a graphics context and frame buffer associated with the display device. In one embodiment, display ID's greater than 2 are virtual displays, meaning that they are not associated with a display physically present on mobile computing device 110.

Graphics information for Android applications and/or activities includes windows, views, and canvasses. Each window, view, and/or canvas is implemented with an underlying surface object. Surface objects are double-buffered (front and back buffers) and synchronized across processes for drawing. SurfaceFlinger maintains all surfaces in a shared memory pool which allows all processes within Android to access and draw into them without expensive copy operations and without using a server-side drawing protocol such as X-Windows. Applications always draw into the back buffer while SurfaceFlinger reads from the front buffer. SurfaceFlinger creates each surface object, maintains all surface objects, and also maintains a list of surface objects for each application. When the application finishes drawing in the back buffer, it posts an event to SurfaceFlinger, which swaps the back buffer to the front and queues the task of rendering the surface information to the frame buffer.

SurfaceFlinger monitors all window change events. When one or more window changeevents occur, SurfaceFlinger renders the surface information to the frame buffer for one or more displays. Rendering includes compositing the surfaces, i.e., composing the final image frame based on dimensions, transparency, z-order, and visibility of the surfaces. Rendering may also include hardware acceleration (e.g., OpenGL 2D and/or 3D interface for graphics processing hardware). SurfaceFlinger loops over all surface objects and renders their front buffers to the frame buffer in their Z order.

FIG. 5 illustrates modified Android kernel 520 in more detail, according to various embodiments. Modified Android kernel 520 includes touch-screen display driver 521, camera driver(s) 522, Bluetooth driver(s) 523, shared memory allocator 524, IPC driver(s) 525, USB driver(s) 526, WiFi driver(s) 527, I/O device driver(s) 528, and/or power management module 530. I/O device driver(s) 528 includes device drivers for external I/O devices, including devices that may be connected to mobile computing device 110 through port 120. Modified Android kernel 520 may include other drivers and functional blocks including a low memory killer, kernel debugger, logging capability, and/or other hardware device drivers.

FIG. 6 illustrates Hydroid OS 660 in more detail, according to various embodiments. Hydroid is a full Linux OS that is capable of running almost any application developed for standard Linux distributions. In particular, libraries layer 662 of Hydroid OS 660 includes Linux libraries that support networking, graphics processing, database management, and other common program functions. For example, user libraries 662 may include the "glibc" Linux C library 664, Linux graphics libraries 662 (e.g., GTK, OpenGL, etc.), Linux utilities libraries 661, Linux database libraries, and/or other Linux user libraries. Applications run on Hydroid within an X-Windows Linux graphical environment using X-Server 674, window manager 673, and/or desktop environment 672. Illustrated applications include word processor 681, email application 682, spreadsheet application 683, browser 684, and other application(s) 685.

The Linux OS graphics system is based on the X-windows (or "XII") graphics system. X-windows is a platform-independent, networked graphics framework. X-windows uses a client/server model where the X-server is the graphics server and applications are the clients. The X-server controls input/output hardware associated with the Linux OS such as displays, touch-screen displays, keyboards, pointing device(s), etc. In this regard, X-windows provides a server-side drawing graphics architecture, i.e., the X-server maintains the content for drawables including windows and pixmaps. X-clients communicate with the X-server by exchanging data packets that describe drawing operations over a communication channel. X-clients access the X communication protocol through a library of standard routines (the "Xlib"). For example, an X-client may send a request to the X-server to draw a rectangle in the client window. The X-server sends input events to the X-clients, for example, keyboard or pointing device input, and/or window movement or resizing. Input events are relative to client windows. For example, if the user clicks when the pointer is within a window, the X-server sends a packet that includes the input event to the X-client associated with the window that includes the action and positioning of the event relative to the window.

Because of the differences in operating system frameworks, graphics systems, and/or libraries, applications written for Android do not generally run on Hydroid OS 660 and applications written for standard Linux distributions do not generally run on Android OS 430. In this regard, applications for Android OS 430 and Hydroid OS 660 are not bytecode compatible, meaning compiled and executable programs for one do not run on the other.

In one embodiment, Hydroid OS 660 includes components of a cross-environment communication framework that facilitates communication with Android OS 430 through shared kernel 520. These components include IPC library 663 that includes the base classes for the Binder IPC mechanism of the Android OS and remote communications service 671.

In one embodiment, Hydroid OS 660 is run within a chrooted (created with the 'chroot' command) secondary execution environment created within the Android root environment. Processes and applications within Hydroid OS 660 are run within the secondary execution environment such that the apparent root directory seen by these processes and applications is the root directory of the secondary execution environment. In this way, Hydroid OS 660 can run programs written for standard Linux distributions without modification because Linux user libraries 662 are available to processes running on Hydroid OS 660 in the chrooted secondary execution environment.

Referring back to FIG. 1, mobile computing device 110 may associate a connected secondary terminal environment 140 with desktop OS 160. In this configuration, computing environment 100 presents a first computing experience through a first active user environment 115 associated with mobile OS 130, and, concurrently, a second computing experience through the second active user environment 140 associated with desktop OS 160.

Figure 7:
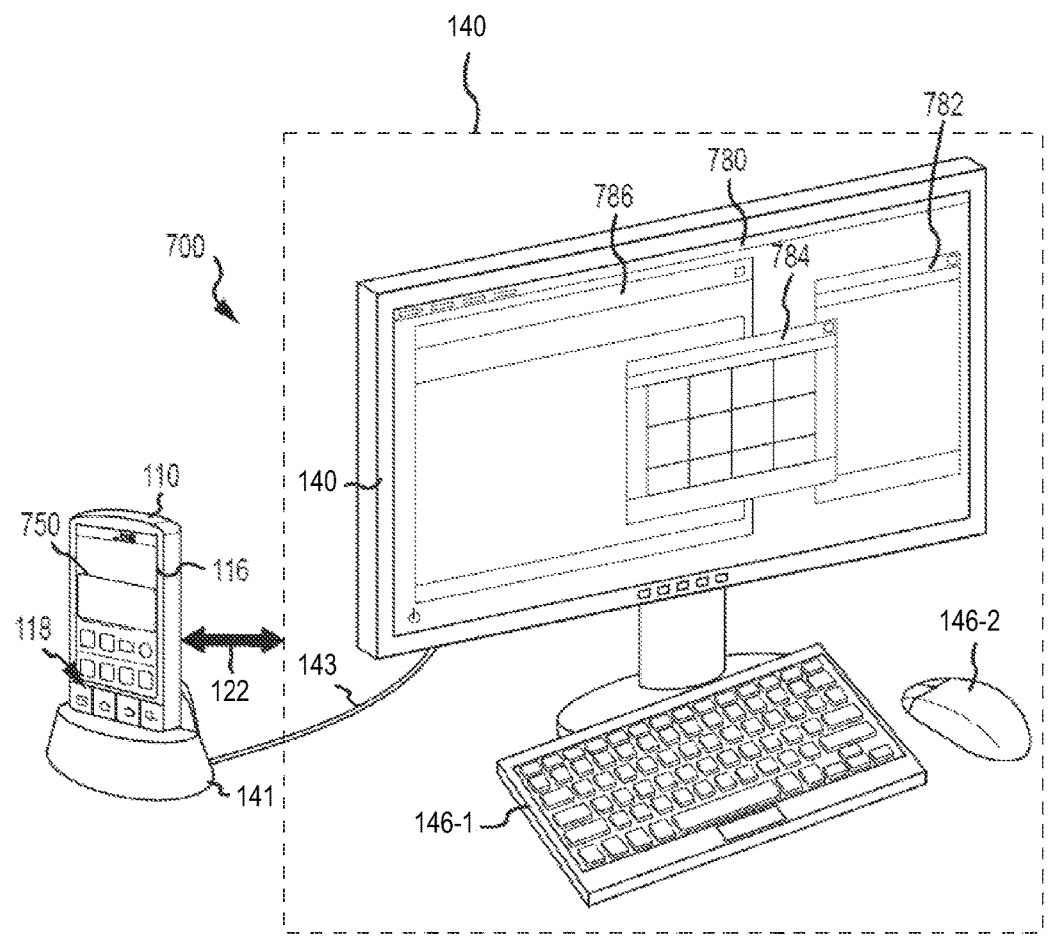
FIG. 7 illustrates a computing environment with multiple active user environments, according to various embodiments.

FIG. 7 illustrates a computing environment 700 with multiple active user environments, according to various embodiments. In computing environment 700, the mobile computing device 110 presents a first active user environment associated with the mobile OS 130 that includes touch-screen display(s) 116 and other I/O devices 118 of mobile computing device 110. As illustrated in FIG. 7, the user interface 750 of the mobile OS 130 is displayed on touch-screen display 116. In computing environment 700, mobile computing device 110 is docked to a second active user environment 140 through dock interface 122. The second active user environment 140 includes display monitor 144, keyboard 146-1, and/or pointing device 146-2. In this regard, the second active user environment 140 provides a desktop-like computing experience. When docked through dock interface 122, the mobile computing device 110 may associate desktop OS 160 with the second active user environment 140 such that the user interface 780 of the desktop OS 160 is displayed on the display 144 of the second active user environment 140. As illustrated in FIG. 7, mobile computing device 110 is connected to components of the second user environment 140 through a dock cradle 141 and/or dock cable 143. However, dock interface 122 may include different connectors including other wired or wireless connections to components of the second active user environment 140.

As described above, the first active user environment defined by mobile computing device 110 and the second active user environment 140 may provide different computing experiences. In addition, mobile OS 130 and desktop OS 160 may have different sets of available applications, meaning that at least some applications available on mobile OS 130 are not available on desktop OS 160 and vice-versa. As such, the configuration of computing environment 700 provides the advantages of two separate active user environments suited to different computing experiences. However, in some instances the user may wish to access various Apps and/or capabilities of one operating system through the active user environment associated with a different operating system. For example, the user may wish to access mobile telephony, location awareness capabilities, and/or other applications and/or services of mobile OS 130 through the second active user environment 140 associated with desktop OS 160.

Because the graphics environments of mobile and desktop OSs are often different, an application running on mobile OS 130 may not be displayed within the user environment associated with desktop OS 160 by re-directing the graphics information from the graphics server of the mobile OS 130 to the graphics server of the desktop OS 160. However, various techniques may be used to display application screens of applications running on mobile OS 130 within a console window of secondary user environment 140 associated with desktop OS 160. These techniques are described in more detail in U.S. patent application Ser. No. 13/246,665, filed Sep. 27, 2011, entitled "INSTANT REMOTE RENDERING," the entire contents of which are incorporated herein for all purposes. Accordingly, one or more application screens displayed in windows 782, 784, and/or 786 of computing environment 700 may correspond to applications running on mobile OS 130.

Figure 8:
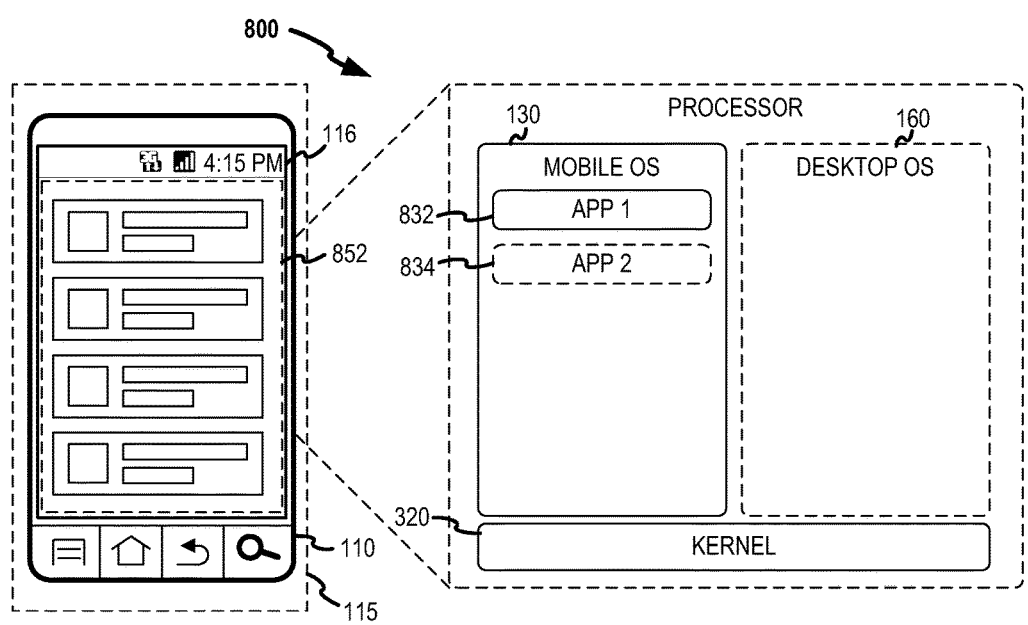
FIG. 8 illustrates a computing environment including a mobile computing device, according to various embodiments.

Consider that initially a user is interacting with mobile computing device 110 in an undocked state. FIG. 8 shows a computing environment 800 which illustrates mobile computing device 110 in an undocked state with multiple applications running on mobile OS 130, according to various embodiments. In computing environment 800, desktop OS 160 may be in a suspended state.

A first application 832 may be running on mobile OS 130 and displayed through application screen 852 on display 116 of the first active user environment 115 defined by mobile computing device 110. Other applications may be running on mobile OS 130 but not actively displayed. For example, application 834 may represent an application that has been started by the user and not explicitly closed. In this instance, the first application 832 is in a foreground interaction state and application 834 is in a background interaction state. In one instance, the user may have started application 834 in the foreground and subsequently started application 832, which then replaced application 834 as the foreground application. In this instance, when application 834 is moved to the background of the first active user environment 115, it may be paused, stopped, and/or suspended. This means that mobile OS 130 does not continue to process instructions or pass user input to processes associated with application 834 beyond instructions that may be needed to put the application into the paused, stopped, and/or suspended state. In addition, some processes associated with application 834 may be stopped or killed. For example, mobile OS 130 may destroy an application screen process associated with a suspended or stopped application if the corresponding memory is in demand for other processes. Accordingly, application screen processes for applications such as application 834 may not be depended on for graphics information once the application is in a background state.

In a computing system with only one active user environment 115 defined by mobile computing device 110, pausing, stopping, and/or suspending background applications is preferred because it reduces processing requirements related to applications that are not being actively interacted with by the user. For example, the user may not be able to interact with more than one application through the first active user environment 115 defined by mobile computing device 115. The user can switch between applications (i.e., change the interaction states of applications) using several techniques including returning to a home screen and selecting the desired application. Processes associated with background applications, including application screen processes, may be restarted or resumed when the application is returned to the foreground state.

Figure 9:
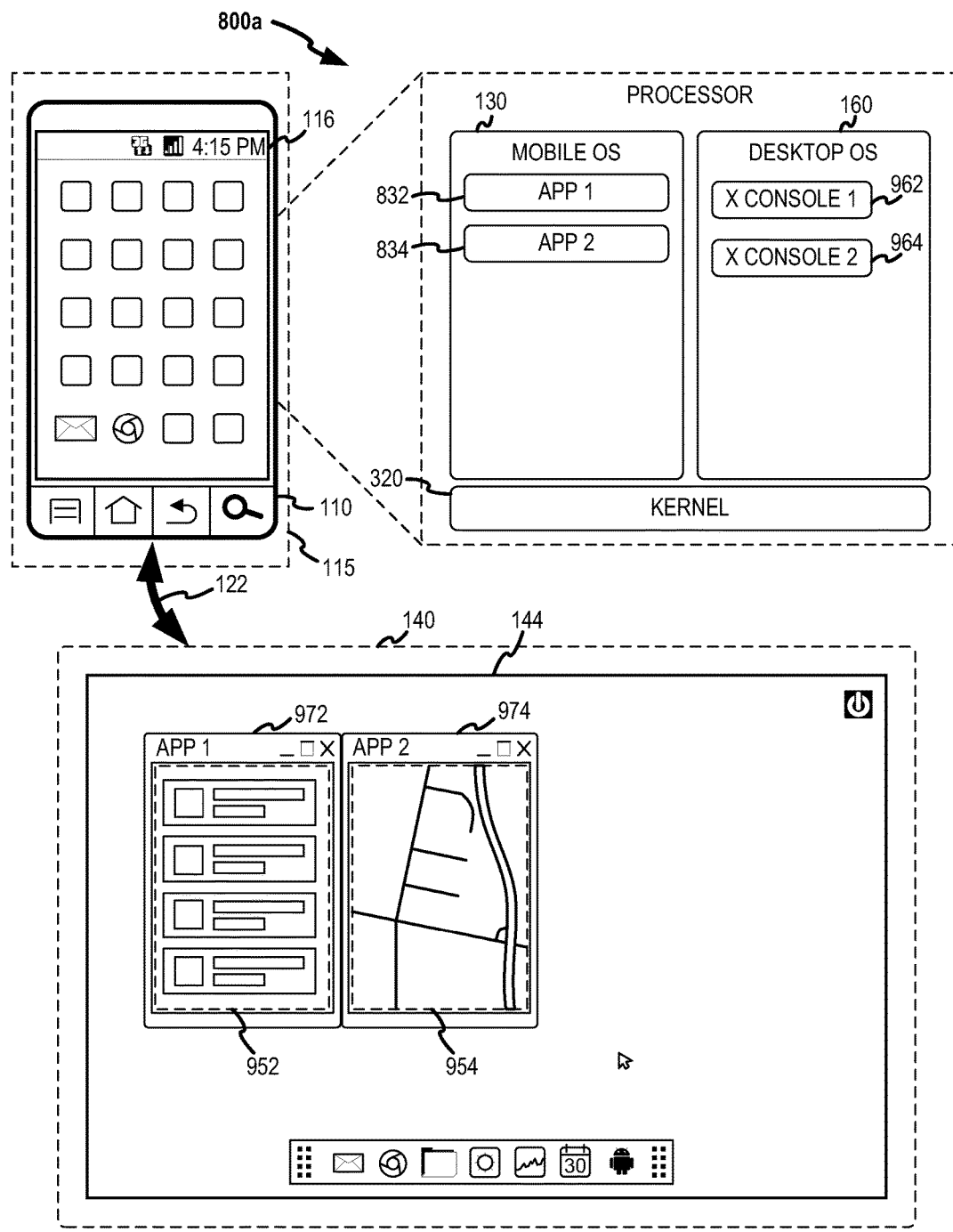
FIG. 9 illustrates aspects of cross-environment assortment of application windows, according to various embodiments.

Embodiments are directed to providing a seamless workflow when mobile computing device 110 is docked with a secondary terminal environment by providing configurable cross-environment application screen behavior. FIG. 9 shows computing environment 800a which illustrates automatic cross-environment assortment of application screens, according to various embodiments. For example, in FIG. 9, mobile computing device 110 is docked to secondary terminal environment 140 through interface 122. Upon docking with secondary terminal environment 140, mobile computing device 110 may recognize that secondary terminal environment 140 has a user experience profile associated with desktop OS 160. Accordingly, desktop OS 160 may be unsuspended and associated with secondary terminal environment 140 to provide a second active user environment through which the user can interact with desktop OS 160.

To provide a more seamless user experience, one or more applications running on mobile OS 130 may be configured to be automatically displayed on display 144 of the second active user environment 140 using the cross-environment display techniques described above when mobile computing device 110 is docked. That is, one or more applications may have a user preference setting that determines if the application should be displayed within a second user environment when the mobile computing device 110 detects a docked condition. The user preference setting may include multiple settings according to different user experience profiles of various secondary terminal environments. For example, user settings may determine that an application should be automatically displayed across user environments for a first type of secondary terminal environment (e.g., desktop-like secondary terminal environment), and display of the application maintained on the first user environment for a second type of secondary terminal environment (e.g., tablet-like secondary terminal environment).

In the embodiment according to FIG. 9, applications 832 and 834 are displayed on display 144 of the second active user environment 140 automatically when the mobile computing device 110 is docked. Specifically, a first console application 962 displays application screen 952 associated with application 832 within console window 972 on display 144. Likewise, a second console application 964 displays application screen 954 associated with application 834 within console window 974 on display 144. Assortment of console windows within the second active user environment 140 may occur in a variety of ways according to user preferences. In FIG. 9, console windows 972 and 974 are tiled horizontally on display 144. However, other window assortment configurations may be chosen by the user by selecting configuration settings. For example, assortment of console windows for cross-environment application display may be done by cascading console windows or other display layering and/or tiling techniques. In embodiments, window assortment configurations may be independently set according to user experience profiles of various secondary terminal environments.

Once mobile computing device 110 is docked, the multiple active user environments may be used in a variety of ways to provide a seamless computing experience. In one configuration, the user may interact with mobile OS 130 including applications available on mobile OS 130 through a first active user environment 115. At the same time, the user may interact with desktop OS 160 including applications available on desktop OS 160 through the second active user environment 140. The user may interact with applications available on mobile OS 130 through the active user environment associated with desktop OS 160 using the cross-environment application display techniques described above.

To access applications available on mobile OS 130 from the active user environment associated with desktop OS 160, the user may want to browse other applications available on mobile OS 130 through the second active user environment 140. In embodiments, menu icons or other elements of the GUI of desktop OS 160 may be used to browse and access applications available on mobile OS 130. In some embodiments, the user may want to browse all running applications on mobile OS 130 (i.e., applications that are in a foreground interaction state and other applications that the user may have opened on mobile OS 130 and not explicitly shut down). However, the lack of maintained or updated graphics information for background applications in mobile OS 130 presents issues for graphical cross-environment navigation and access of applications running in mobile OS 130 from the active user environment associated with desktop OS 160.

Figure 10:
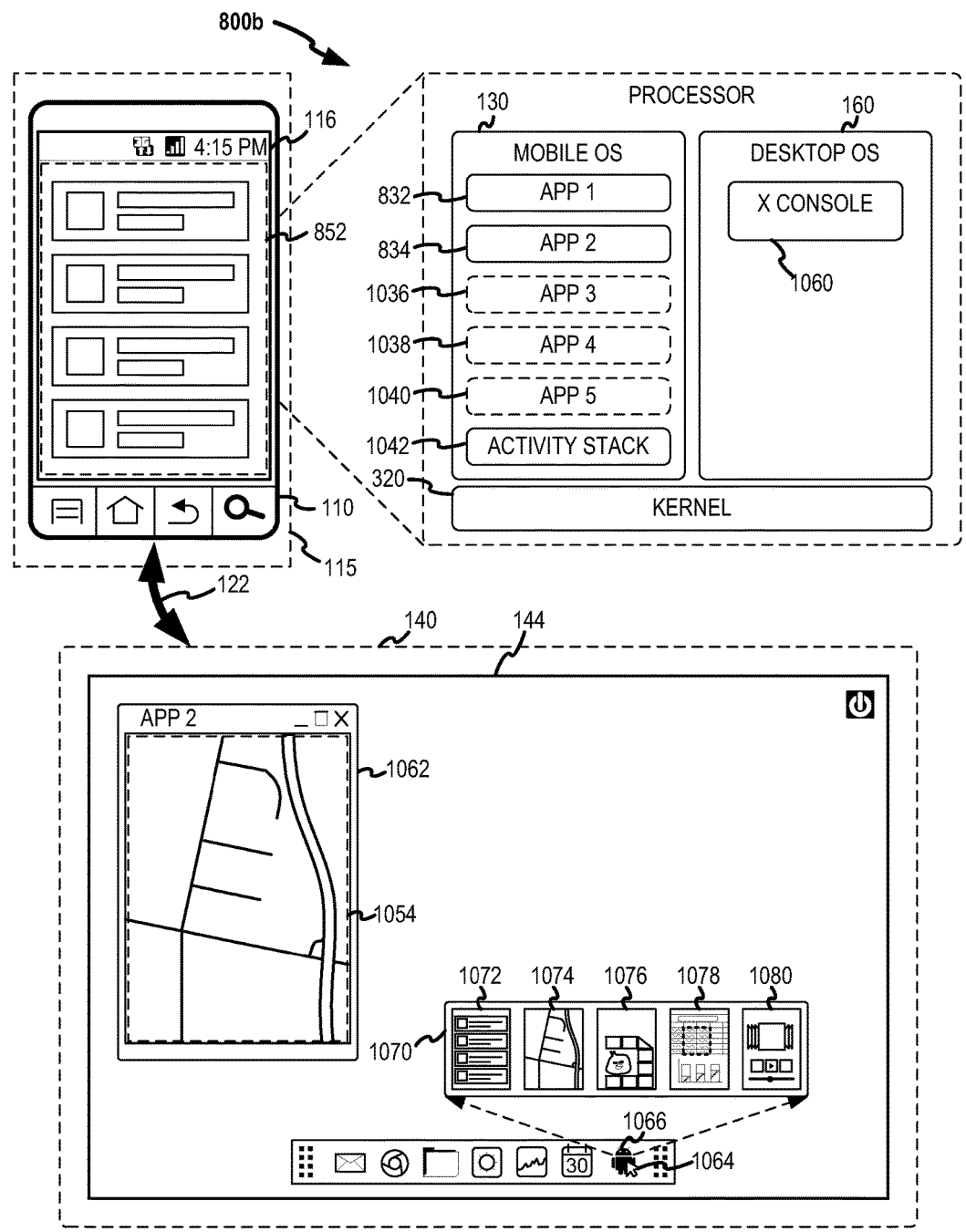
FIG. 10 illustrates aspects of graphical cross-environment application navigation, according to various embodiments.

Embodiments are directed to supporting graphical browsing and navigation in a computing environment with multiple active user environments. FIG. 10 shows computing environment 800b which illustrates cross environment application preview and navigation of foreground and background applications, according to various embodiments. In computing environment 800b, mobile OS 130 and desktop OS 160 run concurrently on shared kernel 320 of mobile computing device 110. Mobile OS 130 is associated with the first active user environment 115 through which the user may interact with application screens of applications running on mobile OS 130. Desktop OS 160 is associated with the second active user environment 140 through which the user may interact with application screens of applications running on desktop OS 160. A first application screen 852, associated with a first application 832 running on mobile OS 130, is displayed on a display 116 of the first active user environment 115. That is, the first application 832 is in a foreground interaction state on the first active user environment 115. A second application screen 1054, associated with a second application 834 running on mobile OS 130, is displayed on the display 144 of the second user environment 140. Specifically, application screen 1054 is displayed within a console window 1062 associated with a console application 1060 running on desktop OS 160, as described above.

In computing environment 800b, other applications may be running on mobile OS 130 but not actively displayed. For example, applications 1036, 1038, and/or 1040 may represent applications that have been started by the user and not explicitly closed as described above. In this instance, applications 1036, 1038, and/or 1040 may be paused, stopped, and/or suspended by mobile OS 130. As described above, this means that application screen processes associated with these applications may be stopped, killed, or otherwise not maintained by mobile OS 130. As such, graphical information for application screen processes associated with these applications may not be maintained while the applications are in the paused, stopped, and/or suspended state.

In embodiments, mobile OS 130 includes functionality for capturing a last graphical representation of applications before the application is swapped from a foreground interaction state to a background interaction state. For example, mobile OS 130 may capture a bitmap image and/or a copy of surface information for a current state of an application screen of a foreground application just before the application is transitioned to the background (i.e., before the interaction state change from the foreground state to the background state). In embodiments, the last graphical representation is captured in a bitmap server of the mobile OS as described in more detail below.

In embodiments, mobile OS 130 maintains an application activity stack 1042 that includes a list of applications that have been started on mobile OS 130 and not explicitly closed. For example, application activity stack 1042 may include place-holders for applications 832, 834, 1036, 1038, and 1040. Place-holders in application activity stack 1042 for applications 832 and 834 (i.e., applications that are in the foreground) may be references to the application processes. As such, to provide a graphical representation of the application, mobile OS 130 may use the current graphics and/or surface information from the application screen process associated with the application. The place-holder for applications 1036, 1038, and/or 1040 (i.e., applications currently in the background of mobile OS 130) may include a reference to the last graphical representation captured by mobile OS 130.

As illustrated in FIG. 10, the last graphical representation may be used to provide a graphical browsing feature within desktop OS 160 of preview screens associated with background applications of mobile OS 130. Specifically, desktop OS 160 may present a preview window 1070 that shows preview screens associated with applications in application activity stack 1042. For example, preview screen 1072 may show a preview representation of a currently active application screen 852 associated with application 832. Preview screen 1074 may also show a preview representation of a currently active application screen 1054 associated with a currently active application 834 that is displayed within a console window 1062 associated with a console application 1060 of desktop OS 160 as described above. Additionally, preview window 1070 may show preview screens for background applications of mobile OS 130. For example, preview window 1070 may present preview screens 1076, 1078, and/or 1080 that represent last graphical representations of application screens associated with background applications 1036, 1038, and/or 1040. Mobile OS 130 may capture these last graphical representations and store them with a list of applications (e.g., via application activity stack 1042, etc.) that are currently running (i.e., started by the user and not explicitly closed).

Preview window 1070 may be activated within desktop OS 160 in a variety of ways. As illustrated in FIG. 10, preview window 1070 may be activated by selecting a menu icon 1066 with a mouse pointer 1064 within the GUI of mobile OS 160. Upon receiving a user input indicating that a preview window is to be displayed, desktop OS 160 queries mobile OS 130 for a list of applications on the application activity stack and the associated graphical preview representations. In response to the query, mobile OS 130 returns a list corresponding to the application activity stack and provides desktop OS 160 with the graphical preview representations associated with application in the list. For example, mobile OS 130 may return a bitmap image for the preview screens or a pointer to a shared memory location that includes the preview screen graphics information.

The user may select preview screens within preview window 1070 to reconfigure the active application screens. For example, the user may select preview screen 1072 to switch the currently displayed user environment for application 832 from the first active user environment 115 to the second active user environment 140. The user may select any of preview screens 1076, 1078, or 1080 to resume the corresponding application 1036, 1038, or 1040 within the second active user environment 140. That is, selecting one of preview screens 1076, 1078, or 1080 will open a new console window on display 144 (and corresponding console application running on desktop OS 160) and resume the corresponding application, with a restarted or resumed application screen associated with the application displayed within the new console window on display 144. Accordingly, the user can graphically browse and navigate running applications of mobile OS 130 through preview window 1070 of desktop OS 160, even where those applications are in a background state and graphical information for associated preview screens is unavailable.

Figure 11:
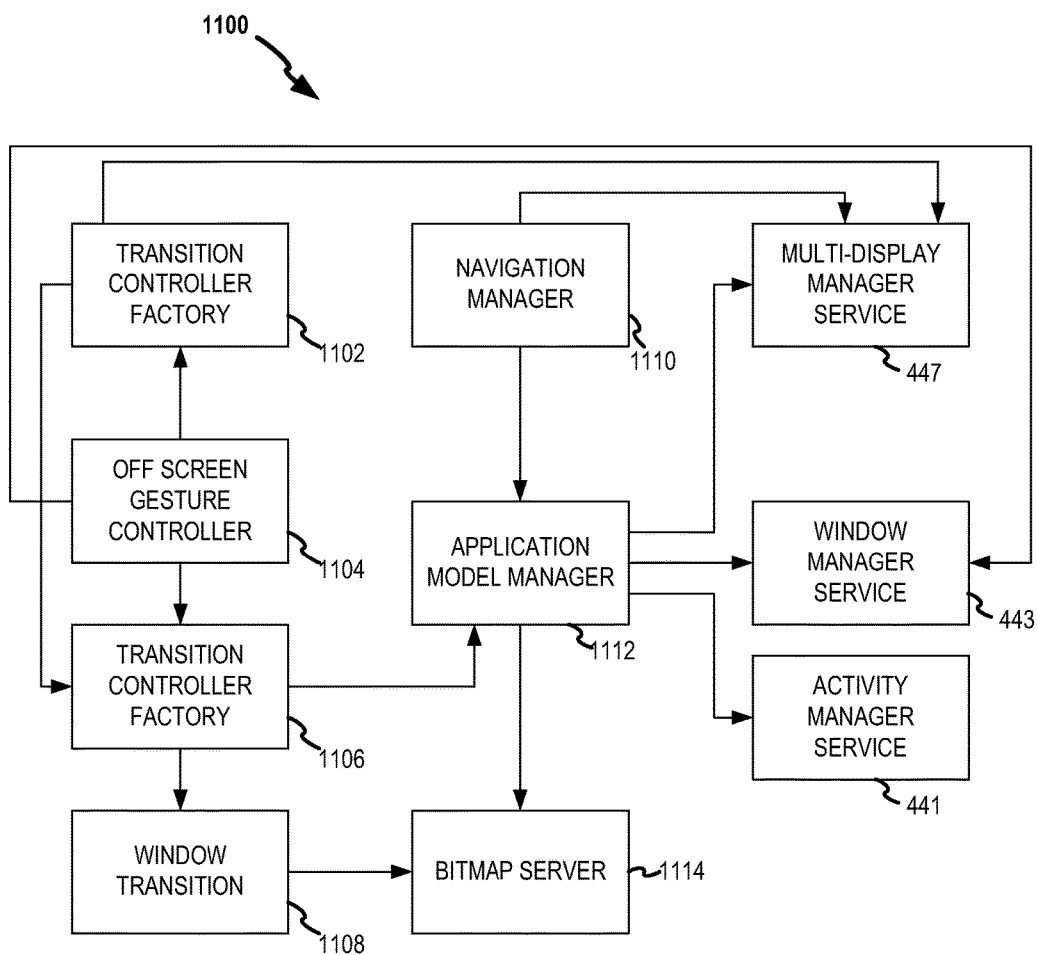
FIG. 11 illustrates aspects of a computing architecture supporting cross-environment application navigation and assortment, according to various embodiments.

As described above, embodiments include an Android mobile OS 430 and a full Linux desktop OS 660 ("Hydroid") running on a modified Android kernel 520. These embodiments may include a window position control feature within the Android OS 430 that includes functionality for managing application preview screens and providing application preview screen data to components with Hydroid OS 660. FIG. 11 illustrates components of the window position control system 1100 of Android OS 430 that implement window position control features allowing the user to view and navigate through applications using multiple displays and/or multiple active user environments. The components of window position control system 1100 include services, managers, and/or application level components of Android OS 430.

The offscreen gesture controller 1104 ("OSGC") and the navigation manager 1100 are user interface components that manipulate a linear model of the Android OS application stack by way of an intermediary known as the application model manager 1112. The application model manager 1112 provides methods to both examine and modify the linear model using the Android activity manager service 441 to do this. In effect the application model manager 1112 transforms the stack view of Android OS 430 to the linear view presented in the navigation manager 1110. Both the OSGC 1104 together with the transition controller 1106 and the navigation manager 1110 manipulate snapshot views of application screens. The navigation manager 1110 may use bitmap images of application screens, while the OSGC 1104 works with live (or apparently live) application screens themselves. To support both of these components the bitmap server 1114 provides mechanisms for rapid capture restore manipulation of the application image screens via JNI calls to C++ code designed to minimize image data transfers.

The bitmap server 1114 is a class that resides in the Android surface manager (i.e., SurfaceFlinger) 434. The bitmap server 1114 provides a highly efficient mechanism to manipulate windows such that the window position control system 1100 can provide intuitive visual effects for application browsing and navigation. The bitmap server 1114 provides an interface to the Java layers (e.g., application layer 450, runtime environment 431) such that window manipulation may be controlled from within Java layers.

The bitmap server 1114 maintains a handle and reference to all active surfaces so that window animations can be applied to any active surfaces and created based on the data within the active surface. When a surface is destroyed by SurfaceFlinger, the bitmap server persists a copy of the surface data so that it can be used to provide window animations for those applications that are no longer active. The bitmap server 1114 also provides bitmap images of surface data to the application model manager and destroys resources (references to surfaces, and persisted surface data) when invoked to do so by the application model manager. The bitmap server 1114 also creates window transition graphics from surface data including arranging window surfaces in a particular Z-order and/or creating new surfaces from rectangle coordinates of existing surfaces for transitions.

The offscreen gesture controller 1104 provides interpretations of user gestures, utilizing a factory class to create various types of transition objects to provide the on-screen visual effects corresponding types of gesture being performed. More particularly, the offscreen gesture controller may be a class in an existing system service that receives motion events from the window manager service 443 and processes them. Upon detecting the beginning of an offscreen gesture the offscreen gesture controller may invoke the transition controller factory to create an instance of the appropriate transition controller type. The offscreen gesture controller may filter out motion events with unintentional offscreen gestures are not processed, record statistics for all motion events within the scope of the gesture should so that gesture velocity may be calculated, and pass "move" motion events to the current transition controller so they can process the events and direct the required visual animation. Upon receiving a response from the current transition controller indicating it cannot continue movement in a given direction, the offscreen gesture controller may invoke the transition controller factory 1102 to create a new instance of a transition controller so that gesture processing can continue. Upon receipt of an up motion event the offscreen gesture controller may invoke the completion method of the current transition controller to automatically complete the transition. Upon completion of the transition invoke, the window manager service 443 may freeze the display so the configuration changes can be processed by applications without unwanted visual effects The transition controller factory 1102 may receive invocations from the off-screen gesture controller 1104 to create instances of transition controllers. Upon invocation to create a transition controller instance, the transition controller factory may retrieve state data and handles to application surface data from the application model manager 1112. For example, the transition controller factory may retrieve state data and handles to graphical information for applications that are visible, for applications that will become visible due to the transition, and/or on which display the relevant applications are visible and the type of information for each application (e.g., application display properties). Upon invocation from the offscreen gesture controller 1104, the transition controller factory creates a transition controller of the appropriate type based on the direction of the gesture, which applications are visible (at the top of the stack), which application screen will become visible because of window movement, and/or on which display the application screen is intended to be visible. The transition controller factory 1102 may be a class residing in an existing mobile OS system service. In one embodiment, the transition controller factory 1102 is a class of the Android OS 430 system service.

Figure 12:
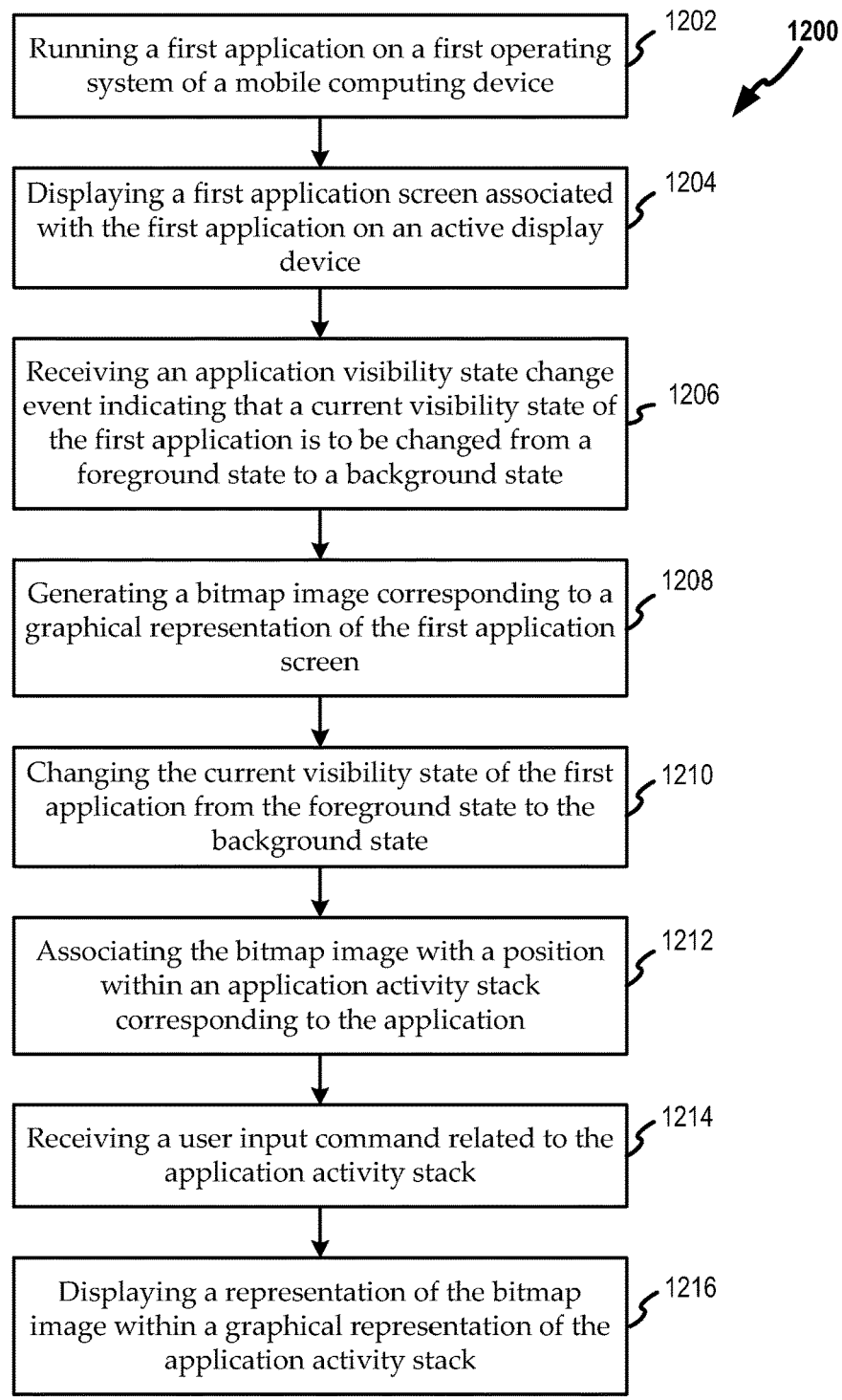
FIG. 12 illustrates a flow diagram for managing graphical navigation in a computing environment, according to various embodiments.

FIG. 12 illustrates a process flow 1200 for cross-environment application navigation using a captured last graphical representation of an application screen, according to various embodiments. In a first block 1202 of process flow 1200, a first application is run on a first operating system of a mobile computing device. At a second block 1204, a first application screen associated with the application is displayed on an active display device. For example, the application screen may be displayed on a display device of the mobile computing device that defines a first active user environment. At block 1206, an application interaction state change event is received that indicates the current interaction state for the first application is to be changed from a foreground to a background state. For example, another application running on the first operating system may be started or swapped to the foreground on the display device. As described above, a transition controller may be invoked by the transition controller factory 906 to handle the interaction state change.

At block 1208, the first operating system captures a graphical representation of the first application screen. For example, the first operating system may include a bit-map server in a surface manager that captures a bit-map representation of the active application screen surfaces. At block 1210, the interaction state of the first application is changed from the foreground state to the backgrounds state. At this stage, processes associated with the first application screen may be paused, stopped, and/or suspended by the first operating system. The first operating system may maintain the first application on an application activity stack, and, at block 1212, the first operating system associates a position of the application activity stack with the captured bit-map Image.

At block 1214, an input command is received related to the application activity stack. The input command may be received within a second active user environment. The second active user environment may be associated with the first operating system or a second operating system running concurrently with the first operating system on a shared kernel of the mobile computing device. At block 1216, a representation of the bitmap image is displayed within a graphical representation of the application activity stack. The graphical representation of the application activity stack may be displayed across active user environments to allow cross-environment graphical navigation of foreground and background applications of the mobile operating system.

The foregoing description has been presented for purposes of illustration and description. Furthermore, the description is not intended to limit embodiments of the invention to the form disclosed herein. While a number of exemplary aspects and embodiments have been discussed above, those of skill in the art will recognize certain variations, modifications, permutations, additions, and sub-combinations thereof.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method comprising:

executing, by a computing device, a first operating system of a mobile device and a second operating system of the computing device, wherein the first operating system is different from the second operating system and wherein the first operating system and the second operating system execute concurrently on a shared kernel of the computing device;

providing, by the mobile computing device, a computing environment with first and second active user environments, wherein the first active user environment is associated with the first operating system, and wherein the second active user environment is associated with the second operating system;

running, by the computing device, a first application on the first operating system executing on the shared kernel of the mobile computing device;

displaying, by the mobile computing device, a first application screen associated with the first application on an active display;

receiving, by the computing device, an application interaction state change event indicating that a current interaction state of the first application is to be changed from a foreground state to a background state;

generating, by the computing device, a bitmap image corresponding to a graphical representation of a current state of an application screen of the first application just before the first application is transitioned from the foreground state to the background state;

changing, by the mobile computing device, the current interaction state of the first application from the foreground state to the background state;

associating, by the computing device, the bitmap image of the first application with a position within an application activity stack containing the first application, wherein the application activity stack is a list of applications that have been started in the first active user environment and the second active user environment and are in background states which are not explicitly closed, wherein the application activity stack includes information about the first application and a second application, and wherein the first and second applications are different and when the mobile computing device is docked to the computing device, the application activity stack is available to be displayed on the computing device;

receiving, by the computing device, a first user input command to display the application activity stack on the computing device which is a representation of the bitmap images of the list of applications in background states;

receiving, at the computing device, a second user command indicative of a selection of the bitmap image of the first application within the application activity stack; and changing the current interaction state of the first application from the background state to the foreground state on the computing device.

2. The method of claim 1, further comprising:

receiving a user command indicative of a selection of the bitmap image within the graphical representation of the application activity stack; and changing the current interaction state of the first application from the background state to the foreground state.

3. The method of claim 1, wherein the shared kernel of the mobile computing device manages task scheduling for processes of both the first operating system and the second operating system.

4. The method of claim 3, wherein an application model manager maintains the application activity stack, the application activity stack including applications that have been started by the user and not actively closed by the user.

5. The method of claim 1, wherein a process associated with the first application screen is suspended in response to the change in the current interaction state of the first application from the foreground state to the background state.

6. The method of claim 5, wherein the bitmap image is generated from graphical information maintained by a bitmap server within a surface manager of the first operating system.

7. The method of claim 6, wherein the bitmap server provides an application level interface to the bitmap image data.

8. A mobile computing device comprising:

a display;

a processor coupled with the display; and a memory coupled with and readable by the processor and storing therein a set of instructions which, when executed by the processor, causes the processor to:

execute a first operating system of a mobile device and a second operating system of the computing device, wherein the first operating system is different from the second operating system and wherein the first operating system and the second operating system execute concurrently on a shared kernel of the computing device;

provide a computing environment with first and second active user environments, wherein the first active user environment is associated with the first operating system, and wherein the second active user environment is associated with the second operating system;

run a first application on the first operating system executing on the shared kernel of the mobile computing device;

display a first application screen associated with the first application on an active display;

receive an application interaction state change event indicating that a current interaction state of the first application is to be changed from a foreground state to a background state;

generate a bitmap image corresponding to a graphical representation of a current state of an application screen of the first application just before the first application is transitioned from the foreground state to the background state;

change the current interaction state of the first application from the foreground state to the background state;

associate the bitmap image of the first application with a position within an application activity stack containing the first application, wherein the application activity stack is a list of applications that have been started in the first active user environment and the second active user environment and are in background states which are not explicitly closed, wherein the application activity stack includes information about the first application and a second application, and wherein the first and second applications are different and when the mobile computing device is docked to the computing device, the application activity stack is available to be displayed on the computing device;

receive a first user input command to display to the application activity stack on the computing device which is a representation of the bitmap images of the list of applications in background states;

receiving, at the computing device, a second user command indicative of a selection of the bitmap image of the first application within the application activity stack; and changing the current interaction state of the first application from the background state to the foreground state on the computing device.

9. The system of claim 8, wherein the instructions further cause the processor to:

receive a user command indicative of a selection of the bitmap image within the graphical representation of the application activity stack; and change the current interaction state of the first application from the background state to the foreground state.

10. The system of claim 8, wherein the shared kernel of the mobile computing device manages task scheduling for processes of both the first operating system and the second operating system.

11. The system of claim 10, wherein an application model manager maintains the application activity stack, the application activity stack including applications that have been started by the user and not actively closed by the user.

12. The system of claim 8, wherein a process associated with the first application screen is suspended in response to the change in the current interaction state of the first application from the foreground state to the background state.

* * * * *

UNITED STATES PATENT AND TRADEMARK OFFICE
CERTIFICATE OF CORRECTION

PATENT NO. : 10,528,210 B2
APPLICATION NO. : 14/834305
DATED : January 7, 2020
INVENTOR(S) : Brian Reeves et al.

Page 1 of 1

It is certified that error appears in the above-identified patent and that said Letters Patent is hereby corrected as shown below:

In the Claims

Claim 8, Column 26, Line 27, after "display" delete "to" therein.

Signed and Sealed this
Seventeenth Day of March, 2020

Andrei Iancu
*Director of the United States Patent and Trademark Office*